US012655249B2

(12) United States Patent
Wang et al.

(10) Patent No.: US 12,655,249 B2
(45) Date of Patent: *Jun. 16, 2026

(54) NORBORNENE ESTERS AS COMONOMERS FOR THERMOSET ARTICLES

(71) Applicant: MATERIA, INC., Pasadena, CA (US)

(72) Inventors: Li-Sheng Wang, Azusa, CA (US); Brian Edgecombe, Anaheim, CA (US); Wenliang Patrick Yang, Ballston Lake, NY (US); Mei Chia Liao, Pomona, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 17/998,075

(22) PCT Filed: May 7, 2021

(86) PCT No.: PCT/US2021/031245

§ 371 (c)(1),
(2) Date: Nov. 7, 2022

(87) PCT Pub. No.: WO2021/226430

PCT Pub. Date: Nov. 11, 2021

(65) Prior Publication Data

US 2023/0174708 A1 Jun. 8, 2023

Related U.S. Application Data

(60) Provisional application No. 63/038,621, filed on Jun. 12, 2020, provisional application No. 63/021,439, filed on May 7, 2020.

(51) Int. Cl.
*C08G 61/08* (2006.01)
*C08F 232/06* (2006.01)
(Continued)

(52) U.S. Cl.
CPC ............. *C08G 61/08* (2013.01); *C08G 61/12* (2013.01); *C08G 2150/00* (2013.01);
(Continued)

(58) Field of Classification Search
CPC ....... C08G 61/08; C08F 232/08; C08F 232/06
See application file for complete search history.

(56) References Cited

U.S. PATENT DOCUMENTS

| | | | | |
|---|---|---|---|---|
| 4,689,380 A * | 8/1987 | Nahm | .................... | C08G 61/08 526/281 |
| 8,293,674 B2 | 10/2012 | Chung et al. | | |
| 2009/0156735 A1* | 6/2009 | Koeniger | ............... | C08G 61/08 526/348 |

FOREIGN PATENT DOCUMENTS

| | | | |
|---|---|---|---|
| EP | 0286839 A1 * | 10/1988 | ............. C08G 61/08 |

OTHER PUBLICATIONS

Liu et al., "Frontal Ring-Opening Metathesis Copolymerization: Deviation of Front Velocity from Mixing Rules," ACS Macro Lett., 2019, 8, 846-851. (Year: 2019).*

(Continued)

*Primary Examiner* — Catherine S Branch
(74) *Attorney, Agent, or Firm* — Raphael Bellum PLLC

(57) ABSTRACT

The invention relates to compositions comprising a) at least one norbornene ester; b) TCPD; c) optionally DCPD; and d) at least one olefin metathesis catalyst. The invention also relates to articles of manufacture made from the compositions of the invention, and methods of making the articles. The invention also relates to coating compositions comprising the compositions of the invention, and to objects or substrates coated with the coating compositions of the invention, which may then be cured. The invention also relates to methods of coating the objects or substrates with the coating compositions of the invention. The invention (Continued)

further relates to the use of the compositions of the invention as adhesives.

16 Claims, 4 Drawing Sheets

(51) Int. Cl.
*C08F 232/08* (2006.01)
*C08G 61/12* (2006.01)

(52) U.S. Cl.
CPC ... *C08G 2170/00* (2013.01); *C08G 2261/135* (2013.01); *C08G 2261/1426* (2013.01); *C08G 2261/3324* (2013.01); *C08G 2261/418* (2013.01)

(56) References Cited

OTHER PUBLICATIONS

International Search Report and Written Opinion in International Application No. PCT/US2021/031245 dated Oct. 1, 2021.
Park et al. "Ring-Opening Metathesis Polymerization of Dicyclopentadiene and Tricyclopentadiene," Macromolecular Research 21 (1):114-117 (2013).
Ashirov et al., "Kinetics of the Metathesis Polymerization of 5,6-Di(methoxycarbonyl)bicyclo[2.2.1]hept-2-enes on an Original Hoveyda-Grubbs II Type Catalyst," Kinetics and Catalysis 54(4):469-474 (2013).
Lyapkov et al., "Relative Reactivity of Dicyclopentadiene and 2,3-Dicarbomethoxy-5-norbornene in Metathesis Copolymerization and the Properties of the Copolymer," Polymer Science, Series C 61(1):49-57 (2019).

* cited by examiner

NORBORNENE ESTERS AS COMONOMERS FOR THERMOSET ARTICLES

CROSS-REFERENCE TO RELATED APPLICATIONS

This application claims priority to U.S. Provisional Application Nos. 63/021,439, filed May 7, 2020, and 63/038,621, filed Jun. 12, 2020, both of which are incorporated herein by reference in their entirety.

FIELD OF INVENTION

This invention relates to compositions comprising norbornene esters, tricyclopentadiene, optionally dicyclopentadiene, and olefin metathesis catalysts. The invention also relates to methods of producing molded articles using the compositions of the invention via a ring-opening metathesis polymerization process. The invention further relates to the use of the compositions of the invention as coatings, such as anti-corrosion coatings and protective coatings, to the use of the compositions of the invention as adhesives, and methods of applying them. The invention also relates to the articles of manufacture made from and/or coated with the compositions of the invention.

The compositions of the invention may be utilized for a wide range of substrates. The invention has utility in the fields of polymers, materials, and manufacture.

BACKGROUND OF THE INVENTION

Norbornenes, such as dicyclopentadiene (DCPD) and tricyclopentadiene (TCPD), are the building blocks for ring-opening metathesis polymerization (ROMP) processes. However, DCPD has unpleasant odor, not only in liquid form as neat or mixture, but also in the manufactured articles as residue. Additionally, DCPD also has safety issue such as flammability and inhalation hazards. Thus, there is a need for alternative monomers with less odor, less safety issues, and, at the same time, still be economic. Alternatively, there exists a need for monomer packages having low levels of DCPD that still have low safety hazards, low toxicity, less unpleasant odor, while still being inexpensive.

U.S. Pat. No. 9,751,975 discloses methods and compositions for ROMP reactions and molded articles from such methods and compositions. The compositions consist of the mixed monomers of DCPD and TCPD.

U.S. Pat. No. 8,906,999 discloses the synthesis of styrene-free unsaturated polyester, which contains ester made from dicarboxylate acids, diols, and DCPD. During the polyester synthesis, DCPD is incorporated into the polymer chain and still carries unstrained or strained cycloolefin. Under ROMP conditions, the polyesters react with DCPD to form a thermoset. The glass transition temperature of the thermoset falls within the range between 40-90° C.

US 2016/0289373 discloses a copolymerization composition involving alkyl norbornene and norbornene monoester. The cross-linkable composition can be polymerized via ROMP to produce a fire-retardant material.

Luz Jr. et al., J. Brazilian Chem. Soc. (2018) 29:1344-1348, discloses co-polymerization of norbornene and norbornene diester using ROMP process with ruthenium catalyst under air.

Lyapkov et al., Procedia Chemistry (2015) 15:8-13, discloses copolymerization of a norbornene diester with a di-norbornene imide to form a cross-linked polymer via ROMP process. As the percentage of bi-functional norbornene increases, the Tg of the copolymer rises.

Verpoort et al., RSC Adv. (2016) 6:5177-5183, discloses the influence of the stereo isomers of norbornene diesters on ROMP polymerization kinetics. The reactivity is in the following order: exo,exo-isomer>exo,endo-isomer>endo,endo-isomer. The reactivity of the isomers is interpreted by the capability of isomers to form intramolecular complexes.

Bowden et al., Macromolecules (2006) 39:498-508, discloses a ROMP polymerization of norbornene monoesters to give an intermediate polymer, which is further modified to form comb-like block copolymer using ATRP and ROP.

Lima-Neto et al., RSC Adv. (2016) 6:75104-75110, discloses bio-based plant oil polymers from norbornene and norbornene ester via ROPM process. The norbornene ester is derived from triglyceride. Co-monomer norbornene must be used to generate the polymer. With different ratio of the two comonomers, the resulting polymers has a different physical appearance, from viscous liquid to soft solid to cracked solid.

SUMMARY OF THE INVENTION

This invention relates to polymerizable compositions comprising, consisting essentially of, or consisting of a monomer system comprising, consisting essentially of, or consisting of norbornene esters and TCPD. These compositions can be molded using a ROMP process to form articles with desirable properties. Other possible uses include as an additive to enhance high temperature oxidative stability, as a coating on organic or inorganic surfaces, and as an adhesion promoter between solid surface and resin. The articles include neat resin or composite.

The compositions of the invention containing the norbornene ester/TCPD monomer system have improved properties compared to known monomer systems, such as DCPD/TCPD. For example, it is not flammable, less odor, and potentially less health hazardous. For example, because norbornene esters have a lower vapor pressure than DCPD, they also have a much better environment, health, and safety (EHS) profile than DCPD. Norbornene esters are inexpensive and can be readily prepared through a simple Diels-Alder reaction. As discussed herein, experiments show that articles made from compositions of the invention are more oxidation stable at elevated temperatures than articles made from comparable DCPD/TCPD monomer packages. For example, a neat panel made from norbornene dimethyl ester/TCPD did not change color to yellow after standing for an extended period in air at room temperature. The panel made from norbornene ester/TCPD resists air oxidation, even at elevated temperature. Aging tests at elevated temperature demonstrated that articles made from norbornene ester/TCPD changed color much slower than comparable TCPD/DCPD panels. This is a very useful attribute for different applications. Thus, the norbornene ester may also be used as an additive to stabilize the molded articles during high temperature curing. Generally, base monomers used for a ROMP process to form thermoset articles are hydrocarbons with no functional groups.

Thus, the invention relates to compositions comprising, consisting essentially of, or consisting of a) at least one norbornene ester; b) TCPD; c) optionally DCPD; and d) at least one olefin metathesis catalyst.

The invention also relates to articles of manufacture made from the compositions of the invention, and methods of making the articles.

The invention further relates to objects or substrates coated with the compositions of the invention, which may then be cured for a coating. The invention also relates to methods of coating the objects or substrates with the compositions of the invention.

The invention further relates to the use of the compositions of the invention as adhesives.

DETAILED DESCRIPTION OF THE INVENTION

Terminology and Definitions

Figure 1:
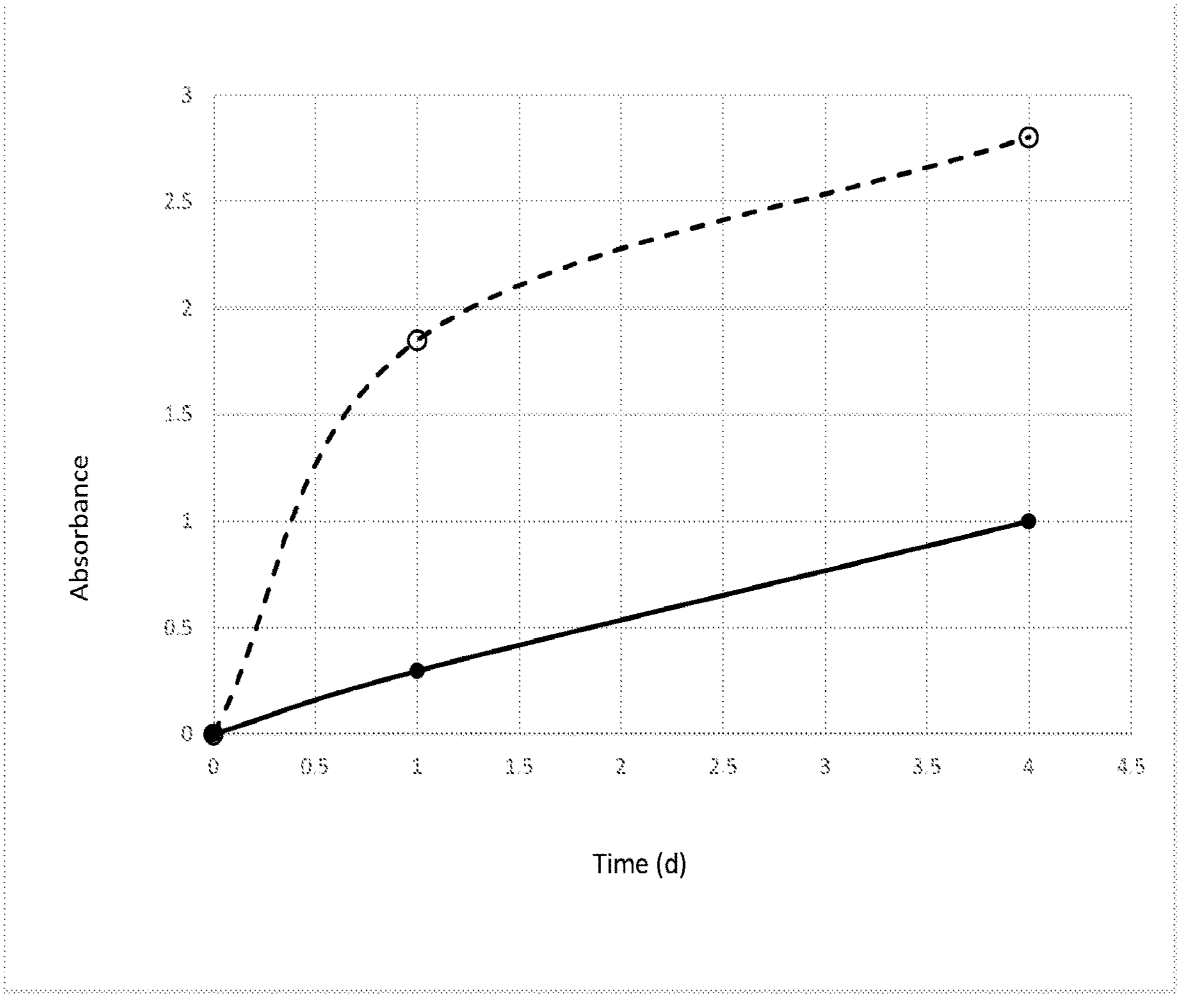
FIG. 1 shows the UV-Vis data of poly($NBCO_2Me$/TCPD) (bottom) and poly(DCPD/TCPD) (top) at 400 nm aged at 120° C. The increased absorption in the blue region of the visible spectrum is consistent with the appearance of yellowing in the heat-aged part.

Unless otherwise indicated, the invention is not limited to specific reactants, substituents, catalysts, olefin metathesis catalysts, catalyst compositions, olefins, cyclic olefin compositions, coating compositions, reaction conditions, or the like, as such may vary. It is also to be understood that the terminology used herein is for the purpose of describing particular embodiments only and is not to be interpreted as being limiting.

In this specification and in the claims that follow, reference will be made to a number of terms, which shall be defined to have the meanings as described herein.

The term "alkyl" as used herein, refers to a linear, branched, saturated hydrocarbon group typically containing 1 to 24 carbon atoms, preferably 1 to 12 carbon atoms, more preferably 1 to 6 carbon atoms: such as methyl (Me), ethyl (Et), n-propyl (Pr or n-Pr), iso-propyl (i-Pr), n-butyl (Bu or n-Bu), iso-butyl (i-Bu), tert-butyl (t-Bu), octyl (Oct), decyl, and the like.

The term "cycloalkyl" refers to a cyclic alkyl group, can be monocyclic, bicyclic or polycyclic, typically having 3 to 10, preferably 5 to 7, carbon atoms, generally, cycloalkyl groups are cyclopentyl (Cp), cyclohexyl (Cy), adamantyl.

The term "substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkylene" as used herein refers to a difunctional linear, branched alkyl group, where "alkyl" is as defined above.

The term "alkenyl" as used herein refers to a linear, branched hydrocarbon group of 2 to 24 carbon atoms containing at least one double bond, such as ethenyl, n-propenyl, iso-propenyl, n-butenyl, iso-butenyl, octenyl, decenyl, tetradecenyl, hexadecenyl, and the like. Preferred alkenyl groups herein contain 2 to 12 carbon atoms, more preferred alkenyl groups herein contain 2 to 6 carbon atoms.

The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "cycloalkenyl" refers to a cyclic alkenyl group, preferably having 3 to 12 carbon atoms.

The term "alkenylene" as used herein refers to a difunctional linear, branched, where "alkenyl" is as defined above.

The term "alkynyl" as used herein refers to a linear or branched hydrocarbon group of 2 to 24 carbon atoms containing at least one triple bond, such as ethynyl, n-propynyl, and the like. Preferred alkynyl groups herein contain 2 to 12 carbon atoms, more preferred alkynyl groups herein contain 2 to 6 carbon atoms.

The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkynylene" as used herein refers to a difunctional alkynyl group, where "alkynyl" is as defined above.

The term "alkoxy" as used herein refers to an alkyl group bound through a single, terminal ether linkage; that is, an "alkoxy" group may be represented as —O-alkyl where "alkyl" is as defined above. Analogously, "alkenyloxy" refer to an alkenyl group bound through a single, terminal ether linkage, and "alkynyloxy" refers to an alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 6 to 10 carbon atoms. Exemplary aryl groups contain one aromatic ring or two fused or linked aromatic rings, e.g., phenyl (Ph), naphthyl, biphenyl, diphenylether, diphenylamine, benzophenone, phenanthryl and the like.

"Substituted aryl" refers to an aryl moiety substituted with one or more substituent groups, and the terms "heteroatom containing aryl" and "heteroaryl" refer to aryl substituents in which at least one carbon atom is replaced with a heteroatom, as will be described in further detail herein.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 6 to 10 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like.

The terms "alkaryloxy" and "aralkyloxy" refer to substituents of the formula —OR wherein R is alkaryl or aralkyl, respectively, as defined herein.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, or —(CO)-alkynyl wherein "alkyl," "aryl," "aralkyl," "alkaryl," "alkenyl," and "alkynyl" are as defined above. The acetoxy group (—O(CO)$CH_3$, often abbreviated as —OAc) is a common example of an acyloxy group.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "polycyclic ring" refers to alicyclic or aromatic groups that may or may not be substituted and/or heteroatom containing, and that have at least two closed rings tethered, fused, linked via a single bond or bridged. Polycyclic rings include without limitation naphthyl, biphenyl, phenanthryl and the like.

The term "spiro compound" refers to a chemical compound, that presents a twisted structure of two or more rings (a ring system), in which 2 or 3 rings are linked together by one common atom.

The terms "halo" and "halogen" and "halide" are used in the conventional sense to refer to a fluorine (F), chlorine (Cl), bromine (Br), or iodine (I) substituent.

"Hydrocarbyl" refers to univalent hydrocarbyl moieties containing 1 to 24 carbon atoms, preferably 1 to 12 carbon atoms, including linear, branched, cyclic, saturated and unsaturated species, such as alkyl groups, alkenyl groups, alkynyl groups, aryl groups, and the like. "Substituted hydrocarbyl" refers to hydrocarbyl substituted with one or more substituent groups.

"Hydrocarbylene" refers to divalent hydrocarbyl moieties containing 1 to 24 carbon atoms, preferably 1 to 12 carbon atoms, including linear, branched, cyclic, saturated and unsaturated species, formed by removal of two hydrogens from a hydrocarbon. "Substituted hydrocarbylene" refers to hydrocarbylene substituted with one or more substituent groups.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. The term "heteroatom-containing hydrocarbylene" and "heterohydrocarbylene" refer to hydrocarbylene in which at least one carbon atom is replaced with a heteroatom. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

In addition, the aforementioned substituent groups may, if a particular group permits, be further substituted with one or more additional substituent groups or with one or more hydrocarbyl moieties such as those specifically enumerated above. Analogously, the above mentioned hydrocarbyl moieties may be further substituted with one or more substituent groups or additional hydrocarbyl moieties such as those specifically mentioned above. Analogously, the above-mentioned hydrocarbylene moieties may be further substituted with one or more substituent groups or additional hydrocarbyl moieties as noted above.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO—X where X is halo), $C_2$-$C_{24}$ alkylcarbonato (—O—(CO)—OO-alkyl), $C_6$-$C_{24}$ arylcarbonato (—O—(CO)—O-aryl), carboxylic acid (—COOH), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), N($C_1$-$C_{24}$ alkyl)($C_5$-$C_{24}$ aryl)-substituted carbamoyl (—(CO)—N($C_1$-$C_{24}$ alkyl)($C_5$-$C_{24}$ aryl), thiocarbamoyl (—(CS)—$NH_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), N($C_1$-$C_{24}$ alkyl)($C_5$-$C_{24}$ aryl)-substituted thiocarbamoyl (—(CS)—N($C_1$-$C_{24}$ alkyl)($C_5$-$C_{24}$ aryl), —C(O)—NH(alkyl) optionally substituted with a silyl group, —C(O)—N(alkyl)$_2$ optionally substituted with a silyl group, carbamido (—NH—(CO)—$NH_2$), cyano (—C≡N), cyanato (—O—C≡N), thiocyanato (—S—C≡N), isocyanate (—NCO), thioisocyanate (—NCS), formyl (—(CO)—H), thioformyl (—(CS)—H), amino (—$NH_2$), mono-($C_1$-$C_{24}$ alkyl)-substituted amino (—NH($C_1$-$C_{24}$ alkyl), di-($C_1$-$C_{24}$ alkyl)-substituted amino ((—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CRNH where, R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CRN(alkyl), where R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), arylimino (—CRN(aryl), where R includes without limitation H, $C_1$-$C_{20}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—$S(O)_2OH$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_1$-$C_{24}$ monoalkylaminosulfonyl (—$SO_2$—N(H) alkyl), $C_1$-$C_{24}$ dialkylaminosulfonyl (—$SO_2$—N(alkyl)$_2$), $C_5$-$C_{24}$ arylsulfonyl (—$SO_2$-aryl), boryl (—$BH_2$), borono (—$B(OH)_2$), boronato (—$B(OR)_2$ where R includes without limitation alkyl or other hydrocarbyl), phosphono (—$P(O)(OH_2)$), phospho (—$PO_2$), phosphino (—$PH_2$), silyl (—$SiR_3$ wherein R is H, hydrocarbyl or $C_1$-$C_6$ alkoxy), and silyloxy (—O-silyl); hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_6$-$C_{10}$ aryl), $C_6$-$C_{24}$ alkaryl (preferably $C_6$-$C_{16}$ alkaryl), or $C_6$-$C_{24}$ aralkyl (preferably $C_6$-$C_{16}$ aralkyl). The hydrocarbyl, alkyl and aryl groups in the above moieties may themselves be substituted.

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one H atom bound to a carbon (or other) atom is replaced with one or more functional group(s) such as those described hereinabove. The term "functional group" is meant to include any functional species that is suitable for the uses described herein. In some cases, the terms "substituent" and "functional group" are used interchangeably.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and thus, the description includes structures wherein a non-hydrogen substituent is present and structures wherein a non-hydrogen substituent is not present.

The term "nil" as used herein, means absent or nonexistent.

The term "sulfhydryl" as used herein, represents a group of formula "—SH."

The term "hydroxyl" as used herein, represents a group of formula "—OH."

The term "carbonyl" as used herein, represents a group of formula "—C(O)—."

The term "ketone" as used herein, represents an organic compound having a carbonyl group linked to a carbon atom such as —$C(O)R^{x1}$, wherein $R^{x1}$ can be alkyl, aryl, cycloalkyl, cycloalkenyl, heterocycle as defined above.

Unless otherwise specified, the term "ester" as used herein, represents an organic compound having a carbonyl group linked to a carbon atom such as —$C(O)OR^{x1}$ wherein $R^{x1}$ can be alkyl, aryl, cycloalkyl, cycloalkenyl, heterocycle as defined above.

The term "amine" as used herein, represents a group of formula "—$NR^xR^y$," wherein $R^x$ and $R^y$ can be the same or independently H, alkyl, aryl, cycloalkyl, cycloalkenyl, heterocycle as defined above.

The term "carboxyl" as used herein, represents a group of formula "—C(O)O—."

The term "sulfonyl" as used herein, represents a group of formula "—$SO_2^-$."

The term "sulfate" as used herein, represents a group of formula "—O—$S(O)_2$—O—."

The term "sulfonate" as used herein, represents a group of the formula "—$S(O)_2$—O—."

The term "amide" as used herein, represents a group of formula "—$C(O)NR^xR^y$," wherein $R^x$ and $R^y$ can be the same or independently H, alkyl, aryl, cycloalkyl, cycloalkenyl, heterocycle as defined above.

The term "sulfonamide" as used herein, represents a group of formula "—$S(O)_2NR^xR^y$" wherein $R^x$ and $R^y$ can be the same or independently H, alkyl, aryl, cycloalkyl, cycloalkenyl, heterocycle as defined above.

The term "sulfoxide" as used herein, represents a group of formula "—S(O)—."

The term "phosphonic acid" as used herein, represents a group of formula "—$P(O)(OH)_2$."

The term "phosphonate ester" as used herein, represents a group of formula "—$P(O)(OR^{x1})_2$," wherein $R^{x1}$ can be alkyl, aryl, cycloalkyl, cycloalkenyl, heterocycle as defined above.

The term "phosphoric acid" as used herein, represents a group of formula "—$OP(O)(OH)_2$."

The term "phosphate ester" as used herein, represents a group of formula "—$OP(O)(OR^{x1})_2$," wherein $R^{x1}$ can be alkyl, aryl, cycloalkyl, cycloalkenyl, heterocycle as defined above.

The term "sulphonic acid" as used herein, represents a group of formula "—$S(O)_2OH$."

The formula "H" as used herein, represents a hydrogen atom.

The formula "O" as used herein, represents an oxygen atom.

The formula "N" as used herein, represents a nitrogen atom.

The formula "S" as used herein, represents a sulfur atom.

Functional groups may be protected in cases where the functional group interferes with the olefin metathesis catalyst, and any of the protecting groups commonly used in the art may be employed. Acceptable protecting groups may be found, for example, in Greene et al., *Protective Groups in Organic Synthesis,* 5th Ed. (New York: Wiley, 2014). Examples of protecting groups include acetals, cyclic acetals, boronate esters (boronates), cyclic boronate esters (cyclic boronates), carbonates, or the like. Examples of protecting groups include cyclic acetals or cyclic boronate esters.

The terms "coating" as used herein, refers to a substance temporarily or permanently applied to a surface or substrate for decorative purpose, to impart a function on a surface or substrate such as electrical passivity or conductivity, or to protect the surface or substrate from deterioration or degradation as a result of its reaction with the environment or corrosive agents. In particular, the coatings in this invention are suitable for industrial coatings such as protective coatings and particularly anti-corrosion coatings. Coatings may be applied as liquids, gases (vapor deposition) or solids.

The term "adhesive" or "adhesive composition" as used herein refers to a substance applied between two substrates to create a bond or joint.

Unless otherwise specified, the term "adhesion promoter" as used herein, refers to an additive or a primer which promotes adhesion of coatings to the substrate of interest. An adhesion promoter usually has an affinity for the substrate and the applied coating.

The term "dispersant" as used herein, refers to agents able to prevent settling or clump and is used interchangeably with "dispersing agent."

The term "antioxidant" is used herein interchangeably with the terms "antiozonant" and is one type of a "stabilizer."

Compositions of the Invention

The invention relates to compositions comprising, consisting essentially of, or consisting of: a) at least one norbornene ester; b) TCPD; c) optionally DCPD; and d) at least one olefin metathesis catalyst.

The at least one norbornene ester may be a norbornene monoester, a norbornene diester, a di-norbornene ester, or mixtures thereof. Preferably, the at least one norbornene ester is selected from the group consisting of at least one norbornene ester of formulae (I), (II), (III), (IV), (V), (VI), (VII), and mixtures thereof:

(I)

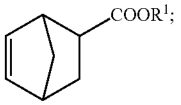

(II)

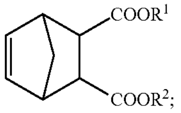

(III)

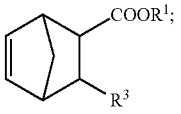

(IV)

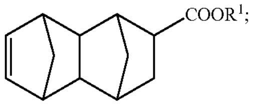

(V)

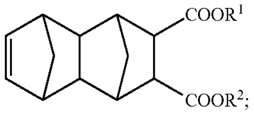

(VI)

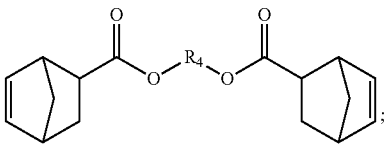

; and

-continued (VII)

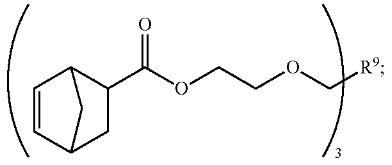

wherein:

$R^1$, $R^2$ and $R^3$ are independently selected from H, optionally substituted linear or branched $C_{1-24}$ alkyl, optionally substituted linear or branched $C_{2-24}$ alkenyl, optionally substituted $C_{3-10}$ cycloalkyl, optionally substituted $C_{3-12}$ cycloalkenyl, optionally substituted heterocycle, optionally substituted $C_{5-24}$ aryl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl); $R_4$ is an optionally substituted linear or branched $C_1$-$C_{12}$ alkyl, -(optionally substituted linear or branched $C_1$-$C_6$ alkyl)-$R_5$-(optionally substituted linear or branched $C_1$-$C_6$ alkyl)-, or —($R_6$)—($R_7$)—($R_8$)—;

$R_5$ is O, an optionally substituted $C_3$-$C_{10}$-cycloalkyl, optionally substituted $C_3$-$C_{12}$ cycloalkenyl, optionally substituted heterocycle, optionally substituted $C_5$-$C_{24}$ aryl;

$R_6$ and $R_8$ are independently selected from -(optionally substituted linear or branched $C_1$-$C_{12}$ alkyl)-aryl-, wherein one or more of the carbon atoms in the $C_1$-$C_{12}$ alkyl may be replaced by O;

$R_7$ is optionally substituted linear or branched $C_1$-$C_6$ alkyl; and $R_9$ is optionally substituted linear or branched $C_1$-$C_6$ alkyl.

More preferably, $R^1$ and $R^2$ are independently selected from optionally substituted linear or branched $C_{1-12}$ alkyl, and $R^3$ is selected from optionally substituted linear or branched $C_{1-12}$ alkyl or optionally substituted $C_{5-24}$ aryl.

When the at least one norbornene ester is of formulae (I) or (IV), $R^1$ is preferably methyl, ethyl, t-butyl, n-butyl, and ethylhexyl.

When the at least one norbornene ester is of formulae (II) or formula (V), $R^1$ and $R^2$ are preferably methyl.

When the at least one norbornene ester is of formula (III), preferably, $R^1$ is methyl or ethyl and $R^3$ is methyl or phenyl.

Preferred norbornene esters of formula (VI) have the following formula:

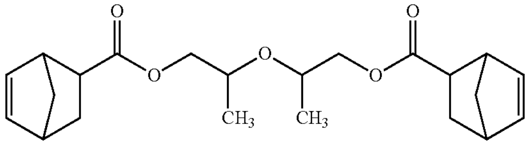

;

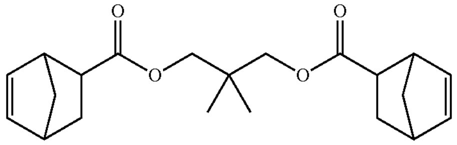

;

-continued

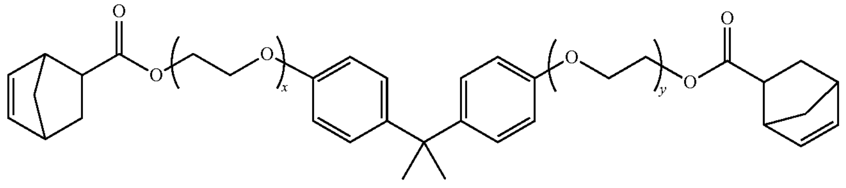, wherein x and y are independently 0, 1, 2, or 3 and the value of x+y is 3;

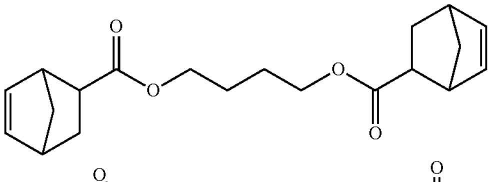; and

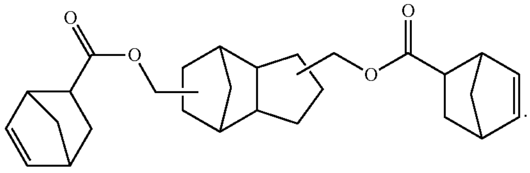.

A preferred norbornene ester of formula (VI) has the following formula:

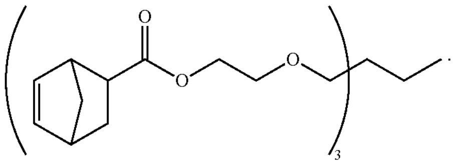.

The at least one norbornene ester may be present in the composition in an amount ranging from about 0.1-99.9 wt. % (e.g., about 0.5-99.5 wt. %, 1-99 wt. %, 5-95 wt. %, 10-90 wt. %, 20-80 wt. %, 30-70 wt. %, 40-60 wt. %, 45-55 wt. %) or about 10, 15, 20, 25, 30, 35, 40, 45, 50, 55, 60, 65, 70, 75, 80, 85, 90, 95, or 99 wt. %, based on the total weight of the composition.

The TCPD may be present in the composition in an amount ranging from about 99.9-0.1 wt. % (e.g., about 99.5-0.5 wt. %, 99-1 wt. %, 95-5 wt. %, 90-10 wt. %, 80-20 wt. %, 70-30 wt. %, 60-40 wt. %, 55-45 wt. %) or about 10, 15, 20, 25, 30, 35, 40, 45, 50, 55, 60, 65, 70, 75, 80, 85, 90, 95, or 99 wt. %, based on the total weight of the composition.

The DCPD, if present, may be present in the composition in an amount ranging from about 99.9-0.1 wt. % (e.g., about 99.5-0.5 wt. %, 99-1 wt. %, 95-5 wt. %, 90-10 wt. %, 80-20 wt. %, 70-30 wt. %, 60-40 wt. %, 55-45 wt. %) or about 10, 15, 20, 25, 30, 35, 40, 45, 50, 55, 60, 65, 70, 75, 80, 85, 90, 95, or 99 wt. %, based on the total weight of the composition.

The compositions of the invention may also contain no DCPD.

Preferably, the compositions of the invention may contain, based on the total weight of the composition, the at least one norbornene ester in an amount ranging from about 60-50 wt. % (e.g., about 60 wt. %, 55 wt. %, 50 wt. %), and the TCPD in an amount ranging from about 40-50 wt. % (e.g., about 40 wt. %, 45 wt. %, 50 wt. %).

For example, a preferred composition of the invention contains, based on the total weight of the composition, the at least one norbornene ester in an amount of about 50 wt. %, the TCPD in an amount of about 50 wt. %. Another preferred composition of the invention contains, based on the total weight of the composition, the at least one norbornene ester in an amount of about 60 wt. %, the TCPD in an amount of about 40 wt. %.

The compositions of the invention may also contain, based on the total weight of the composition, the at least one norbornene ester in an amount ranging from about 30-50 wt. % (e.g., about 30-45 wt. %, 30-40 wt. %, 35-40 wt. %) or about 30, 32, 34, 36, 38, 40, 42, 44, 46, 48, or 50 wt. %, the TCPD in an amount ranging from about 50-30 wt. % (e.g., about 50-35 wt. %, 50-40 wt. %, 50-45 wt. %) or about 50, 48, 46, 44, 42, 40, 38, 36, 34, 32, or 30 wt. %, and the DCPD in an amount ranging from about 20-0.1 wt. % (e.g., about 20-0.5 wt. %, 20-1 wt. %, 20-5 wt. %, 20-10 wt. %, 20-15 wt. %) or about 20, 18, 16, 14, 12, 10, 8, 6, 4, 2, 1, 0.5, 0.1 wt. %.

For example, a preferred composition of the invention contains, based on the total weight of the composition, the at least one norbornene ester in an amount of about 36 wt. %, the TCPD in an amount of about 48 wt. %, and the DCPD in an amount of about 16 wt. %.

The compositions of the invention may further contain a substrate material, including, for example, a plastic or polymer substrate, a polymer-coated substrate (e.g., primer-coated steel), a glass fiber substrate, a carbon fiber substrate, a natural fiber substrate, and a metal oxide substrate.

The compositions of the invention may also contain at least one additive known in the art. Suitable additives include, but are not limited to, gel modifiers, hardness modulators, impact modifiers, fillers, binders, thixotropes, rheology modifiers, dispersants, wetting agents, plasticizers, pigments, flame retardants, dyes, fibers, reinforcement materials, coupling agents (e.g., silane coupling agents), adhesion promoters, film formers, lubricants, and stabilizers such as, for example, antioxidants, antiozonants, UV absorbers, and UV light stabilizers and other stabilizers known in the art. Furthermore, the amount of an additive added to the compositions may vary, depending on the particular type of additive. The additive and the additive loading should not interfere with polymerizing/curing the composition of the invention. Care should be taken when using chemistries that are known to inhibit ROMP. The concentration of the additives in the compositions typically ranges from, for example, about 0.001-95 wt. %, particularly, from about 0.1-75 wt. %, or even more particularly, from 1-60 wt. %, 5-70 wt. %, 10-60 wt. %, or from 20-60 wt. %.

Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers.

Suitable antioxidants or antiozonants include without limitation: primary antioxidants such as 2,6-di-tert-butyl-4-methylphenol (BHT); styrenated phenols, such as Wingstay® S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenols, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction products of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis(2,6-di-tertiary-butylphenol), e.g., Ethanox 4702 or Ethanox 4710; 1,3,5-tris(3,5-di-tert-butyl-4-hydroxybenzyl)isocyanurate, i.e., Good-rite 3114; 2,5-di-tert-amylhydroquinone; tert-butylhydroquinone; 1,6-hexamethylene bis(3-(3,5-di-tert-butyl-4-hydroxyphenylpropionate), such as Irganox 259; octadecyl-3,5-di-tert-butyl-4-hydroxyhydrocinnamate, i.e., Irganox 1076; diphenylamine; 4,4'-diemthoxydiphenylamine; secondary antioxidants such as tris(nonylphenylphosphite); bis(2,4-di-tert-butyl)pentaerythritol)diphosphate; distearyl pentaerythritol diphosphite; phosphited phenols and bisphenols, such as Naugard 492; phosphite/phenolic antioxidant blends, such as Irganox B215; di-n-octadecyl(3,5-di-tert-butyl-4-hydroxybenzyl)phosphonate, such as Irganox 1093; tetrakis(2,4-di-tert-butyl phenyl)4,4'-biphenylylenedi phosphonite; esters of thiodipropionic acid such as Irganox PS 802, Irganox PS 800, and Cyanox MTDP. Such materials are normally employed in the compositions of the invention at levels of about 0.1-10 wt. %, or more preferably at levels of about 0.1-5 wt. %.

As mentioned above, UV absorbers and UV light stabilizers are two examples of the type of stabilizers which may be used in the compositions of the invention. Suitable UV absorbers include nickel quenchers, benzophenones, benzotriazoles, benzyldene malonates, triazines, etc. Suitable UV light stabilizers include hindered amines, etc. The blend of various UV absorbers and UV light stabilizers are also suitable to provide protection against UV. Some suitable UV absorbers include 2-(2H-benzotriazol-2-yl)-p-cresol, 2-tert-Butyl-6-(5-chloro-2H-benzotriazol-2-yl)-4-methylphenol, and 2,2'-methylenebis[6-(2H-benzotriazol-2-yl)-4-(1,1,3,3-tetramethylbutyl)phenol], 2-hydroxy-4-methoxybenzophenone and 2-hydroxy-4-octyloxybenzophenone, as 2-(4,6-diphenyl-1,3,5-triazin-2-yl)-5-[(hexyl)oxy]-phenol; oxanilide UV absorbers such as N-(2-ethoxyphenyl)-N'-(2-ethylphenyl)oxamide, dimethyl 2-(4-methoxybenzylidene) malonate, bis(1,2,2,6,6-pentamethyl-4-piperidyl) sebacate, methyl 1,2,2,6,6-pentamethyl-4-piperidyl sebacate, bis(1,2,2,6,6-pentamethyl-4-pperidyl)sebacate, bis(1-octyloxy-2,2,6,6-tetramethyl-4-piperidyl) sebacate, LOWILITE® Q84 and POLYBATCH® LLUVS 110, Tinuvin 1130, Tinuvin 171, Tinuvin 328, Tinuvin 384-2, Tinuvin 900, Tinuvin 928, Tinuvin 99, Tinuvin 5050, Tinuvin 5060, Tinuvin 5151, Tinuvin 5248, Tinuvin 5251, Tinuvin 5350, Tinuvin 123, Tinuvin 144, Tinuvin 152, Tinuvin 249, Tinuvin 292, Tinuvin 400, Tinuvin 405, Tinuvin 460, Tinuvin 477, Tinuvin 479 (BASF), Chimassorb 81, Chimassorb 944, Chimassorb 2020 (BASF), KEMISORB 10, KEMISORB 11, KEMISORB 111 (Chemipro Kasei Ksisha), BP-2, BP-3, BP-6, BP-9 (Dalian Richfortune Chemicals), Ultra V 301 (Dover, ICI Industries), Grandsorb BP-1, Grandsorb BP-2, Grandsorb BP-4, Grandsorb BP-6 (Hongkun Group), Speed-Block UV-6 (Lamsson), Maxgard 1000, Maxgard 300, Maxgard 400, Maxgard 500, Maxgard 600, Maxgard 700 (Lycus), Cyasorb UV-3346, Hostavin N 30 and the like. Such stabilizers can be used as individual components or in combination with other stabilizers known in the art for compositions. Such materials are normally employed in the compositions of the invention at levels of about 0.1-10 wt. %, but more preferably at levels of about 0.1-5 wt. %.

Suitable fillers include, for example, microparticulate density modulators, such as, microspheres, or macroparticulate density modulators, for example: glass or ceramic beads. Other suitable fillers are inorganic fillers such as, for example, aluminum powder, aluminum flakes (e.g., aluminum flake paste), glass flakes, micaceous iron oxide, calcium carbonate, dolomite, silicas, silicates, talc, kaolin, mica, feldspar, barium sulfate and wollastonites, carbon nanotubes, graphene. Preferred inorganic fillers include aluminum powder, aluminum flakes, micaceous iron oxide, mica, glass fibers, wollastonite, calcium carbonate, silica and mixtures thereof, with flake-like fillers also being preferred. Preferably, the filler is aluminum powder or aluminum flakes (e.g., aluminum flake paste), or alloys thereof. The aluminum powder or aluminum flake may be used alone or in combination with other fillers, such as those mentioned previously. For example, aluminum flake paste may be used alone or in combination with micaceous iron oxide. The fillers, particularly the preferred fillers, may be present in the compositions of the invention in any suitable amount, such as about 0.01-95 wt. %, about 1-95 wt. %, about 5-95 wt. %, about 1-30 wt. %, preferably about 0.01-25 wt. %, preferably about 10-80 wt. %, preferably about 5-70 wt. %, preferably about 10-60 wt. %, preferably about 20-50 wt. %, and most preferably about 15-40 wt. %. The aluminum flakes may have a particle size ranging from about 2-50 microns, preferably about 5-30 microns, most preferably about 10-20 microns. Metallic flakes such as zinc, aluminum, magnesium, nickel, etc. can be added as inorganic fillers to compositions as sacrificial anodes to provide cathodic protection. They can also be used in combination with electrically conducting fillers as taught in U.S. Pat. No. 7,794,626 to provide galvanic anti-corrosion protection to the substrates.

One particularly preferred inorganic filler is Mica C3000, which may be present in the compositions of the invention in an amount ranging from about 0.01-95 wt. % (e.g., about 10-90 wt. %, 20-60 wt. %, 30-50 wt. %), based on the total weight of the composition.

Suitable dyes or pigments include MO 02294 black, MO-80406BV-Yellow from Chromaflo, and white pigment powder TI-PURE from Dupont.

Suitable adhesion promoters include isocyantes and their derivatives; phosphorous containing compounds such as phosphoric acids and phosphate ester containing compounds; sulfonic acid, sulfonate and sulfate containing compounds; carboxylic acid and carboxylate containing compounds; maleic-modified esters; organofunctional silanes; organometallic compounds such as zirconates, zircono aluminates and titanates; chlorinated olefins, etc. Some suitable adhesion promoters are carbamic acid [3-(triethoxysilyl) propyl]-bicyclo[2.2.1]hept-5-en-2-ylmethyl ester (NBCbSi), 3-(trimethoxysilyl)propyl methacrylate, [(5-bicyclo[2.2.1]hept-2-enyl)ethyl]trimethoxysilane, 5-bicyclo [2.2.1]hept-2-enyl)methyldichlorosilane, (5-bicyclo[2.2.1] hept-2-enyl)triethoxysilane, (5-bicyclo[2.2.1]hept-2-enyl) methyldiethoxysilane, (5-bicyclo[2.2.1]hept-2-enyl) dimethylethoxysilane, (3-acryloxypropyl)trimethoxysilane, n-(2-aminoethyl)-3-aminopropyltrimethoxysilane, (3-ethoxysilyl)propylsuccinic anhydride, 2-(3,4-epoxycyclohexyl) ethyltriethoxysilane, ((chloromethyl)phenylethyl)trimethoxysilane, 3-(guanidinyl)propyltrimethoxysilane, n,n-bis(2-hydroxyethyl)-3-aminopropyltriethoxysilane, styrylethyltrimethoxysilane, methacryloxymethyltrimethoxysilane, vinyltriethoxysilane, ureidopropyltriethoxysilane, 3-isocyanatopropyltriethoxysilane, triethoxysilyl modified poly-1,2-butadiene, bis(methyldiethoxysilylpropyl)amine, [2-(3-cyclohexenyl)ethyl]triethoxysilane, hexadecafluorododec-11-en-1-yltrimethoxysilane or mixtures of 2-hydroxyethyl bicyclo[2.2.1]hept-2-ene-5-carboxylate (HENB). Other typical adhesion promoters include coupling agents such as organosilanes (3-isocyanatopropyl triethoxysilane, bicyclo[2.2.1]hept-5-en-2-yl)ethyltrimethoxysilane), organozirconates, organotitanates (Manchem® products (Manchem® Zircoaluminates) (FedChem, LLC) (e.g., Manchem® A, Manchem® APG-X, Manchem® APG-1, Manchem® APG-2, Manchem® APG-3, Manchem® C., Manchem® CPG, Manchem® CPM, Manchem® F., Manchem® FPM, Manchem® M, Manchem® S, Manchem® 376, Manchem® 441) and Kenrich Petrochemicals products such as KR 55 (Titanium IV tetrakis(bis 2-propenolato methyl)-1-butanolato adduct 2 moles (di-tridecyl)hydrogen phosphite), KZ® TPPJ (Zirconium IV (2-ethyl, 2-propenolatomethyl)1,3-propanediolato, cyclo bis 2-dimethylamino pyrophosphato-O, adduct with 2 moles of methanesulfonic acid), KZ® 55 (Zirconium IV tetrakis 2,2(bis-2 propenolatomethyl)butanolato, adduct with 2 moles of di-tridecyl, hydrogen phosphite); phosphate and phosphate esters-containing resins (Sipomer PAM products from Solvay) (e.g., Sipomer PAM-100 (Phosphate esters of polyethylene glycol monomethacrylate), Sipomer PAM-200). Also other Sipomer products from Solvay containing other polar functional groups such as Sipomer WAM products, Sipomer WAM II products, Sipomer COPS-1 products, Sipomer β-CEA, Sipomer BEM, Sipomer IBOA, Sipomer IBOMA, Sipomer SEM-25); carboxylic acid and anhydride-containing resins (Nucrel from DuPont (ethylene acrylic acid copolymer), Escor EAA copolymers from ExxonMobil Chemicals, POLYBOND (acrylic acid grafted polypropylene) from Addivant. Anhydride-containing resins such as FG1901, FG1924 (SEBS grafted with maleic anhydride) from Kraton, ROYALTUF 485, ROYALTUF 498 (EPDM polymers modified with maleic anhydride) from Addivant); isocyanate-containing resins (hexamethylene diisocyanate (HDI); 5-isocyanato-1-(isocyanatomethyl)-1,3,3-trimethyl-cyclohexane (commonly known as isophorone diisocyanate or IPDI); tetramethylxylene diisocyanate (TMXDI), methylene diphenyl diisocyanate (MDI—which may comprise any mixture of its three isomers 2,2'-MDI, 2,4'-MDI, and 4,4'-MDI); 4,4'methylene bis(cyclohexyl isocyanate) (H12MDI); hexamethylene-diisocyanatetrimer (HDIt); toluene diisocyanate (TDI—which may comprise any mixture of 2,4-TDI and 2,6-TDI); 2-biphenylyl isocyanate; 4-benzylphenyl isocyanate; toluene diisocyanates; PM200 (poly MDI), Lupranate® (poly MDI from BASF), Krasol® isocyanate terminated polybutadiene prepolymers, Krasol® LBD2000 (TDI based), Krasol® LBD3000 (TDI based), Krasol® NN-22 (MDI based), Krasol® NN-23 (MDI based), Krasol® NN-25 (MDI based); MDI prepolymer (Lupranate® 5080); liquid carbodiimide modified 4,4'-MDI (Lupranate® MM103); liquid MDI (Lupranate® MI); liquid MDI (e.g., Mondur® ML or Mondur® MLQ, which is a 50/50 blend of 4,4'-MDI and 2,4-MDI), or 2-hydroxyethyl acrylate (HEA) and liquid MDI (Mondur® MLQ), or 9-decen-1-ol and liquid MDI (Mondur® MLQ), or oleyl alcohol and liquid MDI (Mondur® MLQ). The ratio between the alcohol and the liquid MDI varies from 1:1 to 1:10.; bicyclo[2.2.1]hept-5-ene-2-carboxylic acid, and 2-[[[[4-[(4-isocyanatophenyl) methyl]phenyl]amino]carbonyl]oxy]ethyl ester); chlorinated polyolefins such as Eastman CP 343-1, CP343-3, CP515-2, CP-164-1 (Eastman Chemical); Hardlen 13LP (Advanced Polymer); KEPRADH 949, 951, 958, 980, 982 (Kito Chemical); Lanco Intercoat VPP 154, 555 (Lubrizol); HARDLEN 15-LP, BS-40, CY-1132, CY-9122P, CY-9124P; TRAPYLEN 112X, 130X, 135X, 137X, 138S (Tramaco); Special-Primer PP 7560 (Worlee).

Preferably, the adhesion promoter comprises, consists essentially of, or consists of at least one compound containing at least two isocyanate groups. The at least one compound containing at least two isocyanate groups may be selected from a diisocyanate, a triisocyanate, and a polyisocyanate, such as, for example, toluene diisocyanate; tetramethylxylene diisocyanate (TMXDI); methylene diphenyl diisocyanate (MDI); a mixture of the three MDI isomers 2.2'-MDI, 2,4'-MDI, and 4,4'-MDI; liquid MDI; solid MDI; hexamethylenediisocyanatetrimer (HDIt); hexamethylenediisocyanate (HDI); isophorone diisocyanate (IPDI); 4,4'-methylene bis(cyclohexyl isocyanate) (H12MDI); polymeric MDI (PM200); MDI prepolymer; and liquid carbodiimide modified 4,4'-MDI. Preferably, the at least one compound containing at least two isocyanate groups is 4,4'-methylene diphenyl diisocyanate (MDI). The adhesion promoter may further comprise, consist essentially of, or consist of at least one compound containing at least one heteroatom-containing functional group and at least one metathesis-active olefin. The compound containing a heteroatom-containing functional group and a metathesis-active olefin may be selected from 5-norbornene-2-methanol (NB-MeOH); 2-hydroxyethyl bicyclo[2.2.1]hept-2-ene-5-carboxylate (HENB); and allyl alcohol. The adhesion promoter may also be the compound containing a heteroatom-containing functional group and a metathesis-active olefin reacted with the at least one compound containing at least two isocyanate groups. The adhesion promoter composition may be present in an amount ranging from 0.1-10 phr (e.g., 0.5-9.5 phr, 1-9 phr, 2-8 phr, 3-7 phr, 4-6 phr) or about 1 phr, 2, phr, 3 phr, 4 phr, 5 phr, 6 phr, 7 phr, 8 phr, 9 phr, or 10 phr. Other examples of the adhesion promoter that may be used are disclosed in U.S. Pat. Nos. 9,527,982, 10,457,597, 10,633,484, and 10,907,018, each of which are incorporated herein by reference in their entirety.

Suitable rheology modifiers and anti-settling agents include inorganic and organic rheology modifiers. Inorganic rheology modifiers include clays and organoclays of hectorite, bentonite, attapulgite, kaoline, pyrophilite and talc; minerals such as fumed silica, precipitated silica, precipitated calcium carbonate, and montmorillonite, metal organic gellants such as zirconates, aluminates. Organic rheology modifiers include castor oil derivatives, modified polyurea, polyamides, calcium sulfonates, cellulose, shydrophobic ethoxylated urethane resins, Examples of suitable rheology modifiers include fumed silica such as Cab-O-Sil TS610, TS720 from Cabot Corp and AEROSIL 972, AEROSIL 974 from Evonik, organoclay such as BENTOLITE L-10, BENTOLITE-WH, CLAYTONE 40, CLAYTONE AF, MINERAL COLLOID BP, Gararnite 7303 from BYK Chemie, USA; Bentonite 149, Bentonite 329, Bentonite 331, Bentonite 344 from Brentag Specialities, Attagel from BASF and the like, polyaminoamide phosphate, high molecular weight carboxylic add salts of polyamine amides, and alkylene amine salts of an unsaturated fatty add, all available from BYK Chemie USA as ANTI TERRA™, polyamide modified castor oil derivatives such as Luvotix ZH5, Luvitix ZH50 from Lehmann & Voss; micronized amide wax such as Crayvallac SUPER from Arkema.

Suitable coupling agents include, for example, silane coupling agents known in the art. Examples of silane coupling agents include (3-glycidoxypropyl)trimethoxysilane (Silquest A187), (3-glycidoxypropyl)triethoxysilane (Silquest A1871), vinyltrimethoxysilane (Silquest A171), vinyltriethoxysilane (Silquest A151), methacryloxpropyltrimethoxysilane (Silquest A174NT), N-(2-aminoethyl)-3-aminopropyltrimethoxysilane (Silquest A1120), 3-aminopropyltrimethoxysilane (Silquest A1110), hexadecylltrimethoxysilane, isooctyltriethoxysilane, n-octyltriethoxysilane, isobutyltriethoxysilane, methyltrimethoxysilane, and N-ethyl-amino isobutyl trimethoxysilane (Silquest A-Link 15 Silane).

Compositions of the invention may contain additives such as dispersants/dispersing agents (surfactants) known in the art. Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl arnido polyethoxy sulfosuccinnate, tetrasodiurn N-(1,2-dicarboxyethyl)-N-oxtadecyl sulfosuccinnarnate, disodiurn N-octasulfosuccinnamate, sulfated ethoxylated nonylphenol, 2-amino-2-methyl-1-propanol, and the like.

Olefin Metathesis Catalysts

The olefin metathesis catalysts that may be present in the composition of the invention are represented by the general structure of Formula (1):

Formula (1)

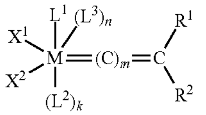

wherein:

M is a Group 8 transition metal; generally, M is ruthenium or osmium; typically, M is ruthenium;

$L^1$, $L^2$, and $L^3$ are independently neutral electron donor ligands;

n is 0 or 1; typically, n is 0;

m is 0, 1, or 2; typically, m is 0;

k is 0 or 1; typically, k is 1;

$X^1$ and $X^2$ are independently anionic ligands; generally, $X^1$ and $X^2$ are independently halogen, trifluoroacetate, per-fluorophenols or together they can form a nitrate; typically, $X^1$ and $X^2$ are independently Cl, Br, I, or F; and $R^1$ and $R^2$ are independently hydrogen, optionally substituted hydrocarbyl, optionally substituted heteroatom-containing hydrocarbyl; typically, $R^1$ is hydrogen and $R^2$ is optionally substituted phenyl, $C_1$-$C_6$ alkyl or substituted 1-propenyl; or $R^1$ and $R^2$ are linked together to form one or more cyclic groups, such as a substituted indenylidene, specifically 3-phenylindenylid-1-ene.

$L^1$ and $L^2$ may be independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently optionally substituted: $C_{6-10}$ aryl or $C_1$-$C_{10}$ alkyl, or $C_{3-10}$ cycloalkyl. Preferably, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-$tolyl_3$), tri-tert-butylphosphine (P-tert-$Bu_3$), tricyclopentylphosphine ($PCp_3$), tricyclohexylphosphine ($PCy_3$), triisopropylphosphine (P-i-$Pr_3$), trioctylphosphine ($POct_3$), triisobutylphosphine, (P-i-$Bu_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$).

$L^1$ and/or $L^2$ may be independently selected from

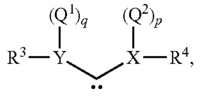

wherein X and Y are independently C, $CR^{3a}$, N, O, S, or P; only one of X or Y can be C or $CR^{3a}$; typically, X and Y are independently N; $Q^1$, $Q^2$, $R^3$, $R^{3a}$ and $R^4$ are independently hydrogen optionally substituted hydrocarbyl, optionally substituted heteroatom-containing hydrocarbyl; generally, $Q^1$, $Q^2$, $R^3$, $R^{3a}$ and $R^4$ are optionally linked to X or to Y via a linker such as optionally substituted hydrocarbylene, optionally substituted heteroatom-containing hydrocarbylene, or —(CO)—; typically $Q^1$, $Q^2$, $R^3$, $R^{3a}$ and $R^4$ are directly linked to X or to Y; and p is 0, when X is O or S, p is 1, when X is N, P or $CR^{3a}$, and p is 2, when X is C; q is 0, when Y is O or S, q is 1, when Y is N, P or $CR^{3a}$, and q is 2, when X is C.

$L^1$ and/or $L^2$ may also be independently selected from

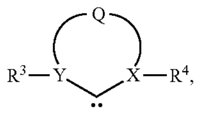

wherein Q is a two-atom linkage having the structure $-[CR^{11}R^{12}]_s-[CR^{13}R^{14}]_t-$ or $-[CR^{11}=CR^{13}]-$; typically Q is $-[CR^{11}R^{12}]_s-[CR^{13}R^{14}]_t-$, wherein $R^{11}$, $R^{12}$, $R^{13}$, and $R^{14}$ are independently hydrogen, optionally substituted hydrocarbyl, optionally substituted heteroatom-containing hydrocarbyl; typically $R^{11}$, $R^{12}$, $R^{13}$, and $R^{14}$ are independently hydrogen, optionally substituted $C_1$-$C_{12}$ alkyl, optionally substituted $C_1$-$C_{12}$ heteroalkyl, optionally substituted $C_5$-$C_{14}$ aryl; "s" and "t" are independently 1 or 2; typically, "s" and "t" are independently 1; or any two of $R^{11}$, $R^{12}$, $R^{13}$, and $R^{14}$ are optionally linked together and can form an optionally substituted, saturated or unsaturated polycyclic ring structure.

$L^1$ and/or $L^2$ can also be independently selected from

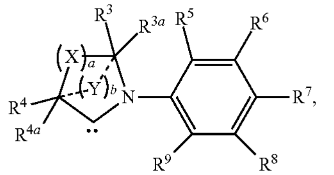

wherein:

X is —$CR^{1a}R^{2a}$—;

a is 1 or 2;

$R^{1a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{2a}$ forms an optionally substituted spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;

$R^{2a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{1a}$ forms a spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;

Y is —$CR^{1b}R^{2b}$—;

b is 0, 1, or 2;

$R^{1b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{2b}$ forms a five-, six-, or ten-membered cycloalkyl or heterocyclic ring, with the carbon atom to which they are attached;

$R^{2b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{1b}$ forms a five-, six-, or ten-membered cycloalkyl or heterocyclic ring, with the carbon atom to which they are attached;

$R^3$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{1a}$ can form an optionally substituted spiro monocyclic or spiro polycyclic $C_{3-10}$ cycloalkyl;

$R^{3a}$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^3$ can form an optionally substituted spiro monocyclic or spiro polycyclic $C_{3-10}$ cycloalkyl;

$R^4$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{4a}$ can form an optionally substituted spiro monocyclic or spiro polycyclic $C_{3-10}$ cycloalkyl;

$R^{4a}$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^4$ can form an optionally substituted spiro monocyclic or spiro polycyclic $C_{3-10}$ cycloalkyl;

$R^5$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ can form an optionally substituted polycyclic ring;

$R^6$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl or together with $R^5$ or together with $R^7$ can form an optionally substituted polycyclic ring;

$R^7$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ or together with $R^8$ can form an optionally substituted polycyclic ring;

$R^8$ is H, optionally substituted $C_{1-24}$ alkyl, halogen —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^8$ can form a polycyclic ring;

$R^{21}$ is OH, $OR^{26}$, $NR^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{22}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{23}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{24}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{25}$ is H, optionally substituted $C_{1-24}$ alkyl, $OR^{22}$, —$NR^{23}R^{24}$, optionally substituted heterocycle, optionally substituted $C_{3-8}$ cycloalkyl, optionally substituted $C_{5-24}$ aryl or optionally substituted $C_{3-12}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{27}$ is H, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

x is 1 or 2; and with the provisos a. when a is 2, then the "X—X" bond can be saturated or unsaturated;

b. when b is 2, the "Y—Y" bond can be saturated or unsaturated;

c. when a is 2, and the "X—X" bond is unsaturated, then $R^{2a}$ is nil;

d. when b is 1, then $R^{3a}$ and $R^{4a}$ are both nil;

e. when b is 2, then $R^{3a}$ and $R^{4a}$ are both nil;

f. when b is 2, and the "Y—Y" bond is unsaturated, then $R^{2b}$ is nil.

$L^1$ and/or $L^2$ may also be independently selected from

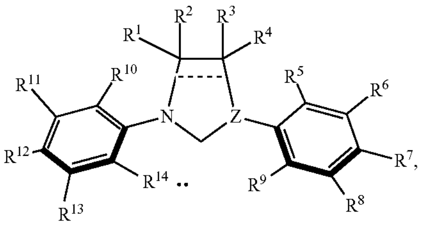

wherein:

Z is N or $CR^{32}$;

$R^1$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl or together with $R^2$ or together with $R^1$ can form a polycyclic ring or together with $R^4$ can form a Spiro compound;

$R^4$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a Spiro compound or together with $R^2$ or together with $R^1$ can form a polycyclic ring;

$R^5$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ can form an optionally substituted polycyclic ring;

$R^{11}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{10}$ or together with $R^{12}$ can form an optionally substituted polycyclic ring;

$R^{12}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{25}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{25}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{32}$ is H, optionally substituted $C_{1-24}$ alkyl, optionally substituted $C_{340}$ cycloalkyl, optionally substituted heterocycle, optionally substituted $C_{5-24}$ aryl or optionally substituted $C_{3-8}$ cycloalkenyl;

$R^{25}$ is OH, O$R^{30}$, N$R^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, O$R^{26}$, —N$R^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl; and x is 1 or 2.

$L^1$ and/or $L^2$ may also be independently selected from

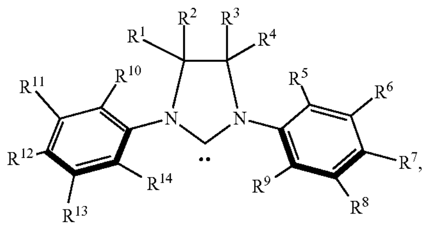

wherein:

$R^1$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^2$ can form a Spiro compound or together with $R^3$ or together with $R^4$ can form a polycyclic ring;

$R^2$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl or optionally substituted $C_{3-8}$ cycloalkenyl or together with $R^2$ or together with $R^1$ can form a polycyclic ring or together with $R^4$ can form a spiro compound;

$R^4$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^3$ can form a spiro compound or together with $R^2$ or together with $R^1$ can form a polycyclic ring;

$R^5$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^6$ can form an optionally substituted polycyclic ring;

$R^6$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^5$ or together with $R^7$ can form an optionally substituted polycyclic ring;

$R^7$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl, optionally substituted $C_{5-7}$ cycloalkenyl, or together with $R^8$ can form an optionally substituted polycyclic ring;

$R^{10}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^{11}$ can form an optionally substituted polycyclic ring;

$R^{11}$ is H, optionally substituted $C_{1-124}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{10}$ or together with $R^{12}$ can form an optionally substituted polycyclic ring;

$R^{12}$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{5-24}$ aryl, optionally substituted $C_{3-8}$ cycloalkenyl, or together with $R^{13}$ can form a polycyclic ring;

$R^{25}$ is OH, O$R^{30}$, N$R^{27}R^{28}$, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{26}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{27}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{28}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{29}$ is H, optionally substituted $C_{1-12}$ alkyl, O$R^{26}$, —N$R^{27}R^{28}$, optionally substituted heterocycle, optionally substituted $C_{5-7}$ cycloalkyl, optionally substituted $C_{6-10}$ aryl or optionally substituted $C_{3-8}$ cycloalkenyl;

$R^{30}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{31}$ is H, optionally substituted $C_{1-12}$ alkyl, optionally substituted $C_{3-10}$cycloalkyl, optionally substituted heterocycle, optionally substituted $C_{6-10}$ aryl or optionally substituted $C_{3-8}$ cycloalkenyl; and x is 1 or 2.

$L^1$ and/or $L^2$ may also be independently selected from

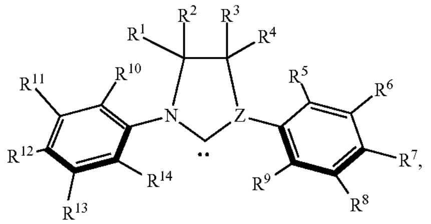

wherein:

$R^1$ is H, phenyl, methyl, ethyl, iso-propyl, n-propyl, n-butyl, tert-butyl, or sec-butyl;

$R^2$ is H, phenyl, methyl, ethyl, iso-propyl, n-propyl, n-butyl, tert-butyl, or sec-butyl;

$R^3$ is H, phenyl, methyl, ethyl, iso-propyl, n-propyl, n-butyl, tert-butyl, or sec-butyl;

$R^4$ is H, phenyl, methyl, ethyl, iso-propyl, n-propyl, n-butyl, tert-butyl, or sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with $R^5$ or together with $R^2$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with $R^7$ or together with $R^9$ can form an optionally substituted polycyclic ring;

$R^9$ is H, methyl, ethyl, iso-propyl, n-propyl, n-butyl, tert-butyl, sec-butyl, F, optionally substituted phenyl, or together with $R^8$ can form a polycyclic ring;

$R^{10}$ is H, methyl, ethyl, iso-propyl, n-propyl, n-butyl, tert-butyl, sec-butyl, optionally substituted phenyl, or together with $R^{11}$ can form an optionally substituted polycyclic ring;

$R^{11}$ is H, methyl, ethyl, iso-propyl, n-propyl, n-butyl, tert-butyl, sec-butyl, optionally substituted phenyl, or together with $R^{10}$ or together with $R^2$ can form an optionally substituted polycyclic ring;

$R^{12}$ is H, methyl, ethyl, iso-propyl, n-propyl, n-butyl, tert-butyl, sec-butyl, F, optionally substituted phenyl, or together with $R^{11}$ or together with $R^{13}$ can form a polycyclic ring;

$R^{13}$ is H, methyl, ethyl, iso-propyl, n-propyl, n-butyl, tert-butyl, sec-butyl, F, optionally substituted phenyl, or together with $R^{12}$ or together with $R^{14}$ can form an optionally substituted polycyclic ring;

$R^{14}$ is H, methyl, ethyl, iso-propyl, n-propyl, n-butyl, tert-butyl, sec-butyl, optionally substituted phenyl, or together with $R^{13}$ can form an optionally substituted polycyclic ring.

$L^2$ may be

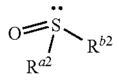

wherein: $R^{a2}$ is hydrogen, optionally substituted hydrocarbyl, optionally substituted heteroatom-containing hydrocarbyl; generally $R^{a2}$ is optionally substituted $C_1$-$C_{10}$ alkyl, optionally substituted $C_3$-$C_{10}$ cycloalkyl, optionally substituted $C_5$-$C_{24}$ aryl; typically $R^{a2}$ is methyl, ethyl, n-propyl, iso-propyl, n-butyl, tert-butyl, cyclohexyl or phenyl; and $R^{b2}$ is hydrogen, optionally substituted hydrocarbyl, optionally substituted heteroatom-containing hydrocarbyl; generally $R^{b2}$ is optionally substituted $C_1$-$C_{10}$ alkyl, optionally substituted $C_3$-$C_{10}$ cycloalkyl, optionally substituted $C_5$-$C_{24}$ aryl; typically $R^{b2}$ is methyl, ethyl, n-propyl, iso-propyl, n-butyl, tert-butyl, cyclohexyl or phenyl; or $R^{a2}$ and $R^{b2}$ are linked together to form a five or a six heterocyclic membered ring with the sulfoxide group [—S(O)—].

$L^2$ may also be

wherein: R is optionally substituted hydrocarbyl, optionally substituted heteroatom-containing hydrocarbyl; generally, R is optionally substituted $C_1$-$C_{10}$ alkyl, optionally substituted $C_3$-$C_{10}$ cycloalkyl, optionally substituted $C_5$-$C_{24}$ aryl; typically, R is methyl, ethyl, n-propyl, iso-propyl, n-butyl, tert-butyl, or phenyl.

$L^2$ may also be

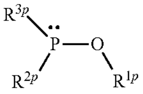

or,

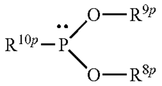

wherein: $R^{1p}$, $R^{2p}$, $R^{3p}$ are each independently optionally substituted $C_6$-$C_{10}$ aryl, or optionally substituted $C_1$-$C_{10}$ alkyl, or optionally substituted $C_3$-$C_{10}$ cycloalkyl. $R^{8p}$, $R^{9p}$, $R^{10p}$ are each independently optionally substituted $C_6$-$C_{10}$ aryl, or optionally substituted $C_1$-$C_{10}$ alkyl, or optionally substituted $C_3$-$C_{10}$ cycloalkyl.

$L^2$ may also be: $PR^{H1}R^{H2}R^{H3}$, wherein: $R^{H1}$, $R^{H2}$, and $R^{H3}$ are each independently optionally substituted $C_6$-$C_{10}$ aryl, or optionally substituted $C_1$-$C_{10}$ alkyl, or optionally substituted $C_3$-$C_{10}$ cycloalkyl. $R^{H1}$ may be methyl, ethyl, n-propyl, iso-propyl, n-butyl, tert-butyl, cyclohexyl, cyclopentyl or phenyl. $R^{H2}$ may be methyl, ethyl, n-propyl, iso-propyl, n-butyl, tert-butyl, cyclohexyl, cyclopentyl or phenyl. $R^{H3}$ may be methyl, ethyl, n-propyl, iso-propyl, n-butyl, tert-butyl, cyclohexyl, cyclopentyl or phenyl. $L^2$ may be :P(Cyclohexyl)$_3$, :P(Et)$_2$Ph, :P(Ph)$_3$.

$X^1$ and $X^2$ may be independently halogen, trifluoroacetate, per-fluorophenols or together they can form a nitrate; typically, $X^1$ and $X^2$ are independently Cl, Br, I or F. Preferably, $X^1$ and $X^2$ are both Cl.

$R^1$ may be hydrogen and $R^2$ may be optionally substituted phenyl, $C_1$-$C_6$ alkyl or substituted 1-propenyl; or $R^1$ and $R^2$ are linked together to form one or more cyclic groups, such as a substituted indenylidene, specifically 3-phenylindenylid-1-ene. $R^1$ may also be hydrogen and $R^2$ may be 2-methyl-1-propenyl. $R^1$ and $R^2$ may also form together a 3-phenylindenylid-1-ene. $R^1$ can also be hydrogen and $R^2$ can be phenyl.

$L^2$ may be

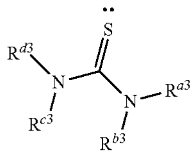

wherein: $R^{a3}$ is optionally substituted hydrocarbyl, optionally substituted heteroatom-containing hydrocarbyl; generally $R^{a3}$ is optionally substituted $C_1$-$C_{10}$ alkyl, optionally substituted $C_3$-$C_{10}$ cycloalkyl, optionally substituted $C_5$-$C_{24}$ aryl; typically $R^{a3}$ is methyl, ethyl, n-propyl, iso-propyl, n-butyl, tert-butyl, cyclohexyl, benzyl or phenyl; $R^{b3}$ is optionally substituted hydrocarbyl, optionally substituted heteroatom-containing hydrocarbyl; generally, $R^{b3}$ is optionally substituted $C_1$-$C_{10}$ alkyl, optionally substituted $C_3$-$C_{10}$ cycloalkyl, optionally substituted $C_5$-$C_{24}$ aryl; typically, $R^{b3}$ is methyl, ethyl, n-propyl, iso-propyl, n-butyl, tert-butyl, cyclohexyl, benzyl or phenyl; or $R^{a1}$ and $R^{b3}$ can be linked to form a five-, six- or seven-membered heterocycle ring with the nitrogen atom they are linked to; $R^{c3}$ is optionally substituted hydrocarbyl, optionally substituted heteroatom-containing hydrocarbyl; generally, $R^{c3}$ is optionally substituted $C_1$-$C_{10}$ alkyl, optionally substituted $C_3$-$C_{10}$ cycloalkyl, optionally substituted $C_5$-$C_{24}$ aryl; typically, $R^{c3}$ is methyl, ethyl, n-propyl, iso-propyl, n-butyl, tert-butyl, cyclohexyl, benzyl or phenyl; $R^{d3}$ is optionally substituted hydrocarbyl, optionally substituted heteroatom-containing hydrocarbyl; generally, $R^{d3}$ is optionally substituted $C_1$-$C_{10}$ alkyl, optionally substituted $C_3$-$C_{10}$ cycloalkyl, optionally substituted $C_5$-$C_{24}$ aryl; typically, $R^{d3}$ is methyl, ethyl, n-propyl, iso-propyl, n-butyl, tert-butyl, cyclohexyl, benzyl or phenyl; or $R^{c3}$ and $R^{d3}$ can be linked to form a five-, six- or seven-membered heterocycle ring with the nitrogen atom they are linked to; or $R^{b3}$ and $R^{c3}$ can be linked to form a five-, six- or seven-membered heterocycle ring with the nitrogen atoms they are linked to.

The moiety

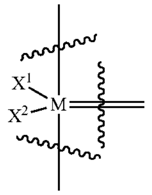

may be

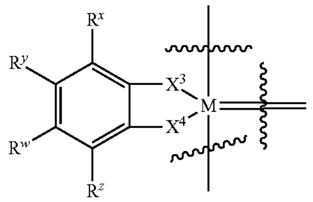

wherein: $X^3$ and $X^4$ are independently O or S; typically, $X^3$ and $X^4$ are independently S; and $R^x$, $R^y$, $R^w$, and $R^z$ are independently hydrogen, halogen, optionally substituted hydrocarbyl, optionally substituted heteroatom-containing hydrocarbyl; generally $R^x$, $R^y$, $R^w$, and $R^z$ are independently hydrogen, halogen, optionally substituted $C_1$-$C_{12}$ alkyl, optionally substituted $C_3$-$C_{10}$ cycloalkyl, optionally substituted $C_5$-$C_{24}$ aryl; typically, $R^{x1}$, $R^y$, $R^w$, and $R^z$ are independently $C_1$-$C_6$ alkyl, hydrogen, optionally substituted phenyl, or halogen; or $R^{x1}$ and $R^y$ are linked together to form an optionally substituted bicyclic or polycyclic aryl; or $R^w$ and $R^z$ are linked together to form an optionally substituted bicyclic or polycyclic aryl; or $R^y$ and $R^w$ are linked together to form an optionally substituted bicyclic or polycyclic aryl.

The olefin metathesis catalyst used in the composition of the invention may also be represented by the general structure of Formula (2):

Formula (2)

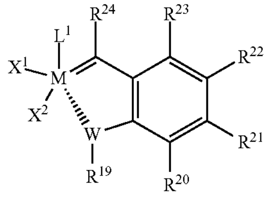

wherein:

M is ruthenium;

$L^1$, $X^1$, and $X^2$ are as defined herein;

W is O, halogen, $NR^{33}$ or S;

$R^{19}$ is H, optionally substituted $C_{1-24}$ alkyl, —$C(R^{34})(R^{35})COOR^{36}$, —$C(R^{34})(R^{35})C(O)H$, —$C(R^{34})(R^{35})C(O)R^{37}$, —$C(R^{34})(R^{35})CR^{38}(OR^{39})(OR^{40})$, —$C(R^{34})(R^{35})C(O)NR^{41}R^{42}$, —$C(R^{34})(R^{35})C(O)NR^{41}OR^{40}$, —$C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{25}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{25}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{25}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, $OR^{30}$, $NR^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, $OR^{26}$, —$NR^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl; and x is 1 or 2.

The olefin metathesis catalyst used in the composition of the invention may also be represented by the general structure of Formula (2):

Formula (2)

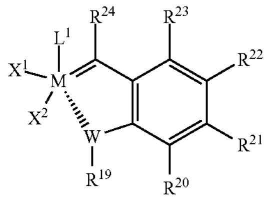

wherein:

M is ruthenium;

$L^1$, $X^1$, and $X^2$ are as defined herein;

W is O, halogen, $NR^{33}$, or S;

$R^{19}$ is H, optionally substituted $C_{1-12}$ alkyl, $—C(R^{34})(R^{35})COOR^{36}$, $—C(R^{34})(R^{35})C(O)H$, $—C(R^{34})(R^{35})C(O)R^{37}$, $—C(R^{34})(R^{35})CR^{38}(OR^{39})(OR^{40})$, $—C(R^{34})(R^{35})C(O)NR^{41}R^{42}$, $—C(R^{34})(R^{35})C(O)NR^{41}OR^{40}$, $—C(O)R^{25}$, optionally substituted heterocycle, optionally substituted $C_{5-7}$ cycloalkyl, optionally substituted $C_{6-10}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-12}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ can form a polycyclic ring;

$R^{21}$ is H, optionally substituted $C_{1-12}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{5-7}$ cycloalkyl, optionally substituted $C_6$-10 aryl, optionally substituted $C_{3-8}$ cycloalkenyl or together with $R^{20}$ or together with $R^{22}$ can form a polycyclic ring;

$R^{22}$ is H, optionally substituted $C_{1-12}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ or together with $R^{23}$ can form a polycyclic ring;

$R^{23}$ is H, optionally substituted $C_{1-12}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{22}$ can form a polycyclic ring;

$R^{24}$ is H, optionally substituted $C_{1-12}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{5-7}$ cycloalkyl, optionally substituted $C_{6-10}$ aryl or optionally substituted $C_{3-8}$ cycloalkenyl;

$R^{25}$ is OH, $OR^{30}$, $NR^{27}R^{28}$, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{26}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{27}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{28}$ is H, optionally substituted $C_{1-12}$ alkyl, optionally substituted $C_{5-7}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-12}$ alkyl, $OR^{26}$, $—NR^{27}R^{28}$, optionally substituted heterocycle, optionally substituted $C_{5-7}$ cycloalkyl, optionally substituted $C_{6-10}$ aryl or optionally substituted $C_{3-8}$ cycloalkenyl;

$R^{30}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{31}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{33}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{34}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{35}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{36}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{37}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{38}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{39}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{40}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{41}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{42}$ is H, optionally substituted $C_{1-12}$ alkyl, optionally substituted $C_{5-7}$ cycloalkyl, optionally substituted heterocycle, optionally substituted $C_{640}$ aryl or optionally substituted $C_{3-8}$ cycloalkenyl; and x is 1 or 2.

The olefin metathesis catalyst used in the composition of the invention may also be represented by the structure of Formula (2):

Formula (2)

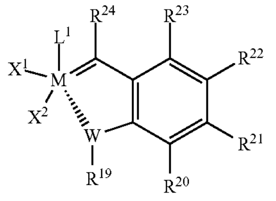

wherein:

M is ruthenium;

$L^1$, $X^1$, and $X^2$ are as defined herein;

W is O;

$R^{19}$ is H, methyl, ethyl, n-propyl, iso-propyl, n-butyl, tert-butyl, cyclohexyl, cyclopentyl or phenyl;

$R^{20}$ is H, methyl, ethyl, n-propyl, iso-propyl, n-butyl, tert-butyl, cyclohexyl, cyclopentyl or phenyl;

$R^{21}$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl or phenyl;

$R^{25}$ is OH, $OR^{30}$, $NR^{27}R^{28}$, methyl, ethyl, n-propyl, iso-propyl, n-butyl, tert-butyl, cyclohexyl, cyclopentyl or phenyl;

$R^{26}$ is H, methyl, ethyl, n-propyl, iso-propyl, n-butyl, tert-butyl, cyclohexyl, cyclopentyl or phenyl;

$R^{27}$ is H, methyl, ethyl, n-propyl, iso-propyl, n-butyl, tert-butyl, cyclohexyl, cyclopentyl or phenyl;

$R^{28}$ is H, methyl, ethyl, n-propyl, iso-propyl, n-butyl, tert-butyl, cyclohexyl, cyclopentyl or phenyl;

$R^{29}$ is H, methyl, ethyl, n-propyl, iso-propyl, n-butyl, tert-butyl, $OR^{26}$, —$NR^{27}R^{28}$, cyclohexyl, cyclopentyl or phenyl;

$R^{30}$ is methyl, ethyl, n-propyl, iso-propyl, n-butyl, tert-butyl, cyclohexyl, cyclopentyl or phenyl;

$R^{31}$ is H, methyl, ethyl, n-propyl, iso-propyl, n-butyl, tert-butyl, cyclohexyl, cyclopentyl or phenyl;

x is 1 or 2.

The olefin metathesis catalyst used in the composition of the invention may also be represented by the structure of Formula (2):

Formula (2)

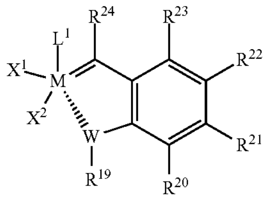

wherein:

$L^1$ is

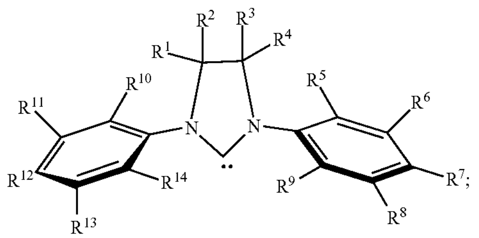

$R^1$ is H, phenyl, methyl, ethyl, iso-propyl, n-propyl, n-butyl, tert-butyl, or sec-butyl;

$R^2$ is H, phenyl, methyl, ethyl, iso-propyl, n-propyl, n-butyl, tert-butyl, or sec-butyl;

$R^3$ is H, phenyl, methyl, ethyl, iso-propyl, n-propyl, n-butyl, tert-butyl, or sec-butyl;

$R^4$ is H, phenyl, methyl, ethyl, iso-propyl, n-propyl, n-butyl, tert-butyl, or sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with $R^5$ or together with $R^7$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with $R^7$ or together with $R^9$ can form an optionally substituted polycyclic ring;

$R^9$ is H, methyl, ethyl, iso-propyl, n-propyl, n-butyl, tert-butyl, sec-butyl, F, optionally substituted phenyl, or together with $R^8$ can form a polycyclic ring;

$R^{10}$ is H, methyl, ethyl, iso-propyl, n-propyl, n-butyl, tert-butyl, sec-butyl, optionally substituted phenyl, or together with $R^{11}$ can form an optionally substituted polycyclic ring;

$R^{11}$ is H, methyl, ethyl, iso-propyl, n-propyl, n-butyl, tert-butyl, sec-butyl, optionally substituted phenyl, or together with $R^{10}$ or together with $R^2$ can form an optionally substituted polycyclic ring;

$R^{12}$ is H, methyl, ethyl, iso-propyl, n-propyl, n-butyl, tert-butyl, sec-butyl, F, optionally substituted phenyl, or together with $R^{11}$ or together with $R^{13}$ can form a polycyclic ring;

$R^{13}$ is H, methyl, ethyl, iso-propyl, n-propyl, n-butyl, tert-butyl, sec-butyl, F, optionally substituted phenyl, or together with $R^{12}$ or together with $R^{14}$ can form an optionally substituted polycyclic ring;

$R^{14}$ is H, methyl, ethyl, iso-propyl, n-propyl, n-butyl, tert-butyl, sec-butyl, optionally substituted phenyl, or together with $R^{13}$ can form an optionally substituted polycyclic ring.

$R^{19}$ is H, methyl, ethyl, n-propyl, iso-propyl, n-butyl, tert-butyl, cyclohexyl, cyclopentyl or phenyl;

$R^{20}$ is H, methyl, ethyl, n-propyl, iso-propyl, n-butyl, tert-butyl, cyclohexyl, cyclopentyl or phenyl;

$R^{21}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl or phenyl;

$R^{25}$ is OH, $OR^{30}$, $NR^{27}R^{28}$, methyl, ethyl, n-propyl, iso-propyl, n-butyl, tert-butyl, cyclohexyl, cyclopentyl or phenyl;

$R^{26}$ is H, methyl, ethyl, n-propyl, iso-propyl, n-butyl, tert-butyl, cyclohexyl, cyclopentyl or phenyl;

$R^{27}$ is H, methyl, ethyl, n-propyl, iso-propyl, n-butyl, tert-butyl, cyclohexyl, cyclopentyl or phenyl;

$R^{28}$ is H, methyl, ethyl, n-propyl, iso-propyl, n-butyl, tert-butyl, cyclohexyl, cyclopentyl or phenyl;

$R^{29}$ is H, methyl, ethyl, n-propyl, iso-propyl, n-butyl, tert-butyl, $OR^{26}$, —$NR^{27}R^{28}$, cyclohexyl, cyclopentyl or phenyl;

$R^{30}$ is methyl, ethyl, n-propyl, iso-propyl, n-butyl, tert-butyl, cyclohexyl, cyclopentyl or phenyl;

$R^{31}$ is H, methyl, ethyl, n-propyl, iso-propyl, n-butyl, tert-butyl, cyclohexyl, cyclopentyl or phenyl;

x is 1 or 2.

The olefin metathesis catalyst used in the composition of the invention may also be represented by the structure of Formula (2):

Formula (2)

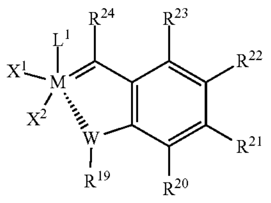

wherein:

$L^1$ is

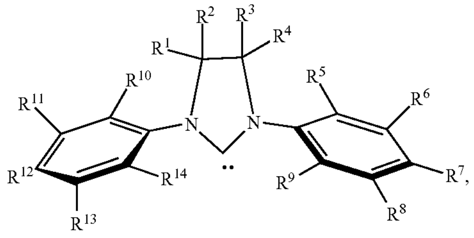

wherein:

$R^1$ is H;

$R^2$ is H;

$R^3$ is H;

$R^4$ is H;

$R^5$ is H, methyl, or iso-propyl;

$R^6$ is H;

$R^7$ is H, methyl;

$R^8$ is H;

$R^9$ is H, methyl, or iso-propyl;

$R^{10}$ is H, methyl, or iso-propyl;

$R^{11}$ is H;

$R^{12}$ is H or methyl;

$R^{13}$ is H;

$R^{14}$ is H, methyl, or iso-propyl;

$X^1$ and $X^2$ are Cl;

W is O;

$R^{19}$ is iso-propyl;

$R^{20}$ is H;

$R^{21}$ is H;

$R^{22}$ is H;

$R^{23}$ is H; and $R^{24}$ is H.

The olefin metathesis catalysts used in the compositions of the invention can be represented by general structures:

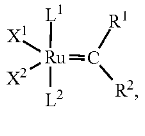

-continued
Formula (4)
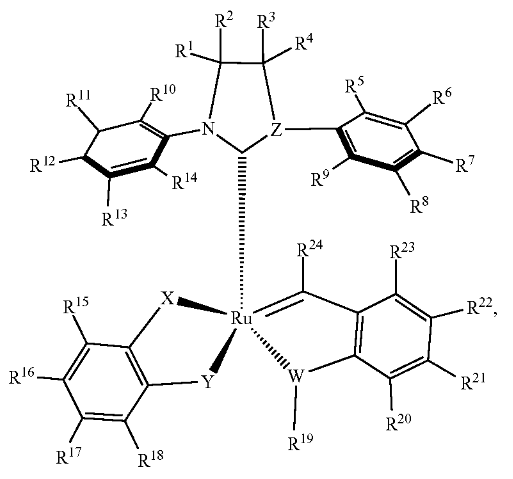
Formula (6)
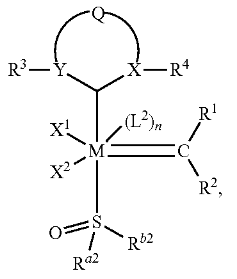
Formula (7)
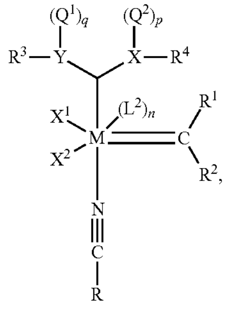
Formula (5)
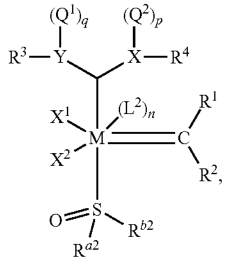
-continued
Formula (9)
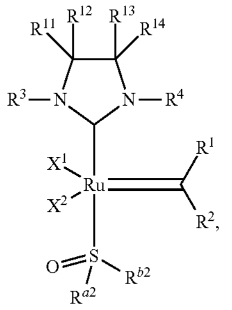
Formula (8)
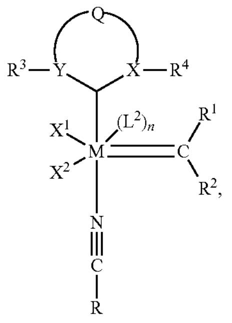
Formula (10)
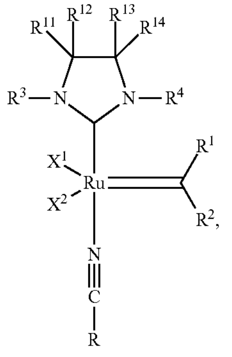
Formula (11)
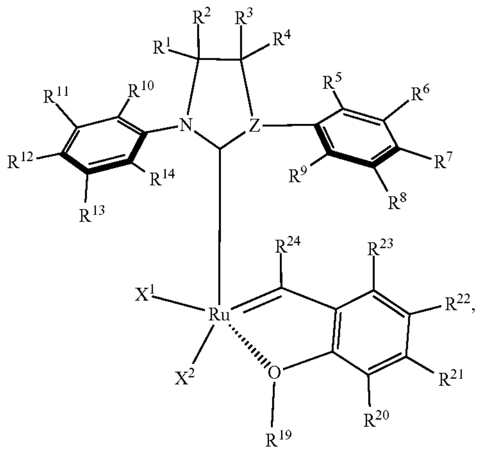

-continued
Formula (12)
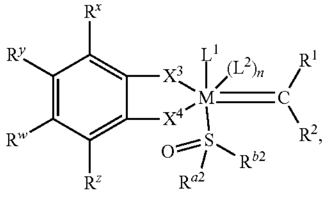
Formula (13)
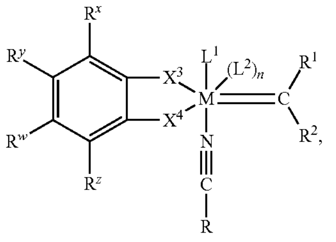
Formula (14)
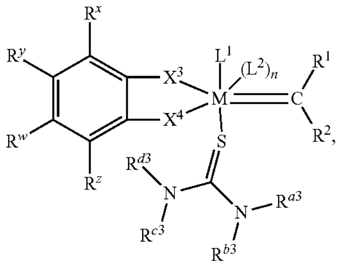
Formula (15)
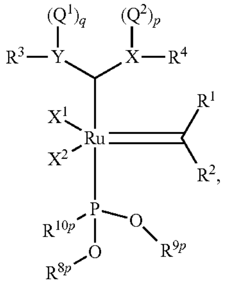
Formula (16)
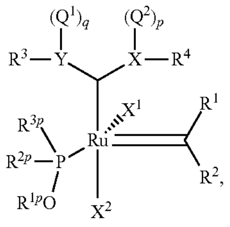
Formula (17)
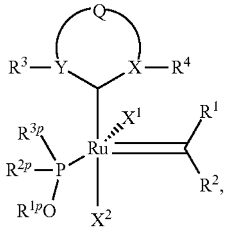
-continued
Formula (18)
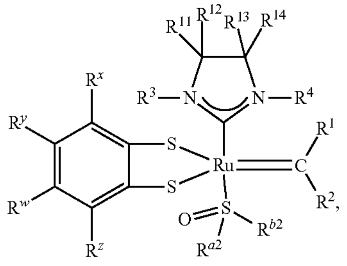
Formula (19)
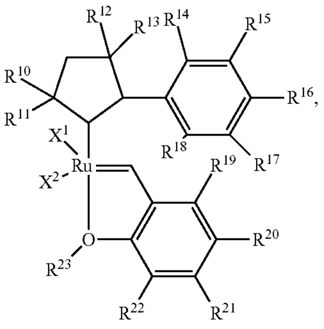
Formula (20)
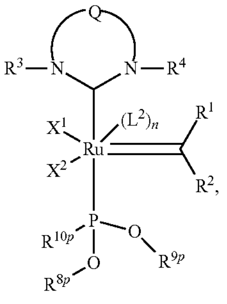
Formula (21)
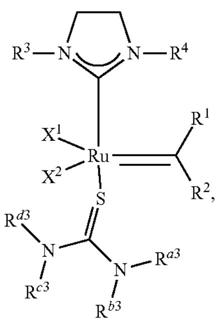

-continued

Formula (22)

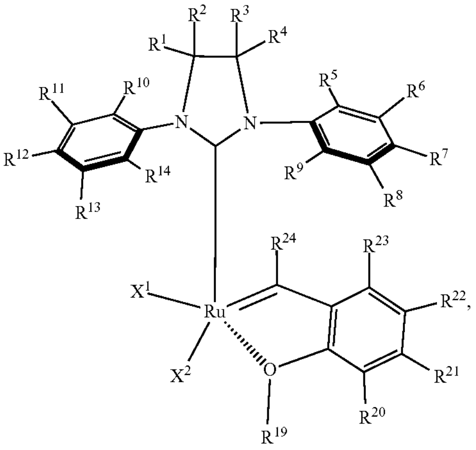

Formula (23)

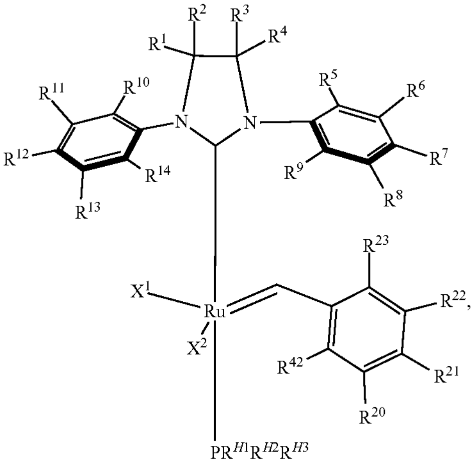

Formula (24)

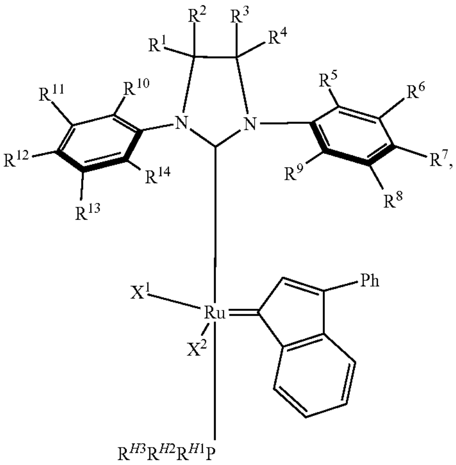

-continued

Formula (25)

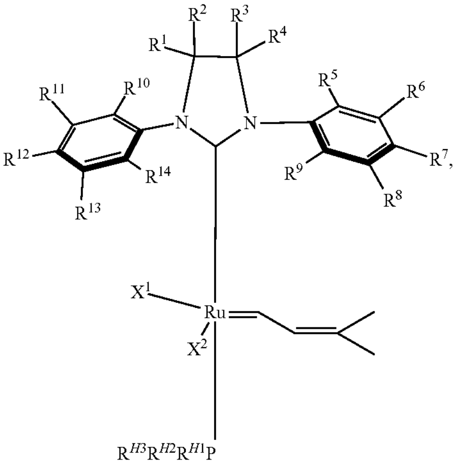

Formula (26)

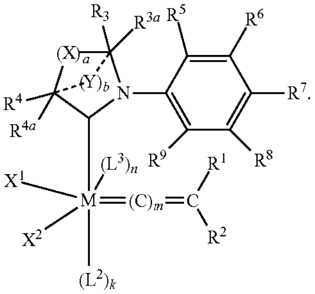

wherein Q, $Q^1$, $Q^2$, p, q, $X^1$, $X^2$, $X^3$, $X^4$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{20}$, $R^{21}$, $R^{22}$, $R^{23}$, $R^{24}$, $R^{a2}$, $R^{b2}$, $R^{a3}$, $R^{b3}$, $R^{c3}$, $R^{d3}$, $R^{1p}$, $R^{2p}$, $R^{3p}$, $R^{H1}$, $R^{H2}$, $R^{H3}$, $-L(^2)_n-$ and $R^{42}$ are as defined herein.

Preferred olefin metathesis catalysts used in the compositions of the invention are encompassed by Formulae:

Formula (22)

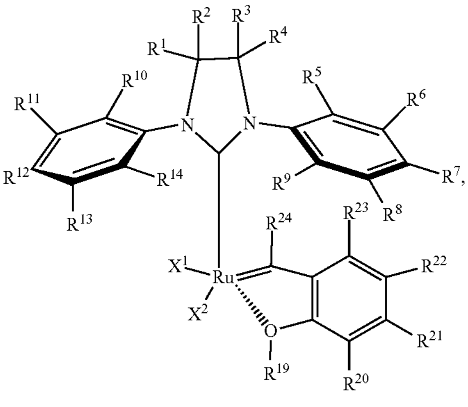

-continued
Formula (23)
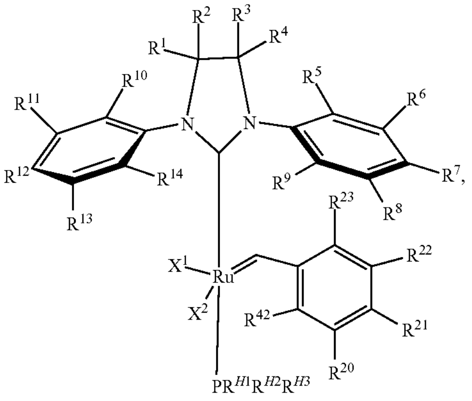
Formula (24)
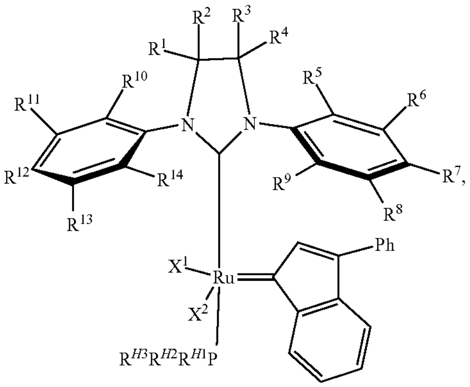
or
Formula (25)
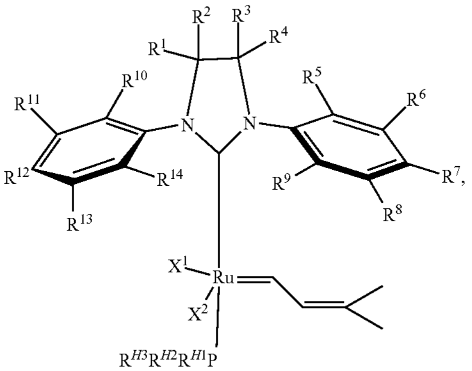
wherein $X^1$, $X^2$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{19}$, $R^{20}$, $R^{21}$, $R^{22}$, $R^{23}$, $R^{24}$, $R^{H1}$, $R^{H2}$, $R^{H3}$ and $R^{42}$ are as defined herein.
Most preferred olefin metathesis catalysts used in the compositions of the invention are encompassed by Formulae:
Formula (22)
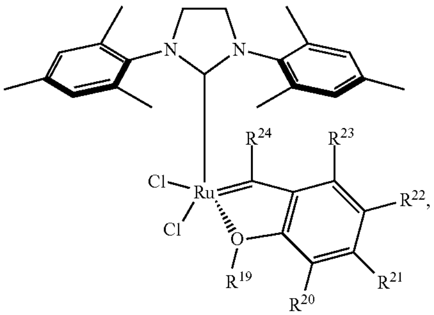
Formula (22)
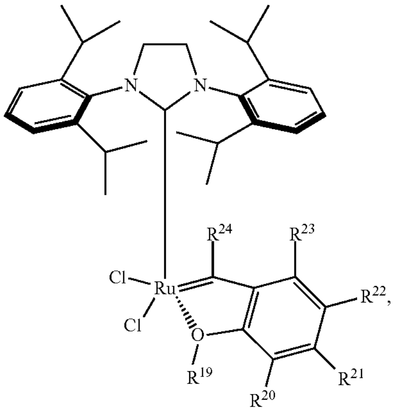
C627
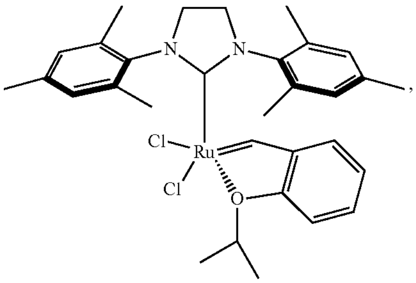
Formula (23)
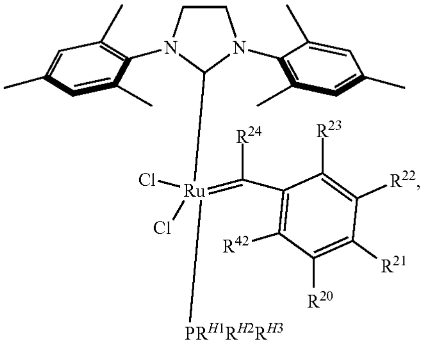

-continued

C835

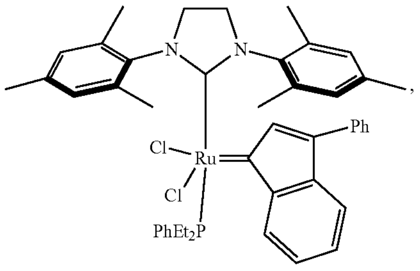

Formula (23)

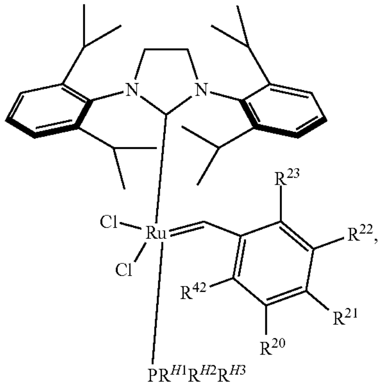

C848

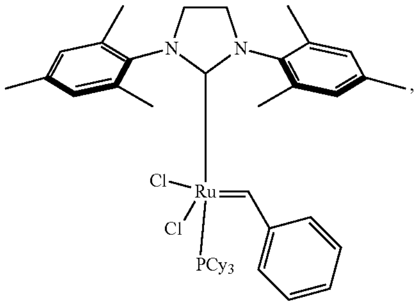

Formula (24)

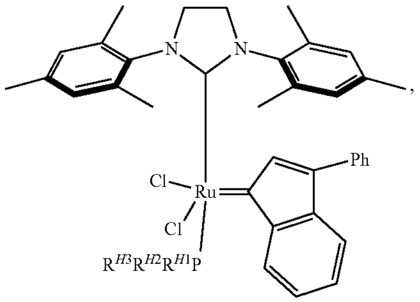

Formula (25)

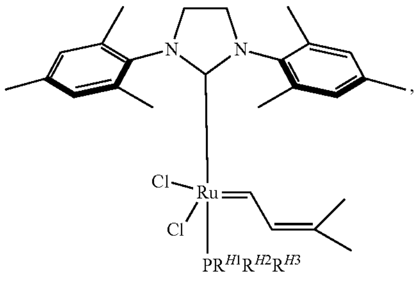

-continued

Formula (25)

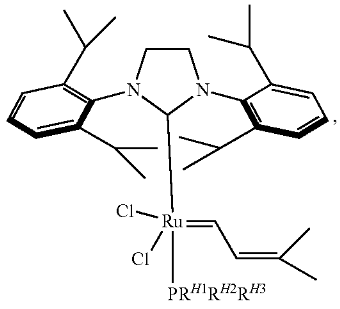

, or

C827

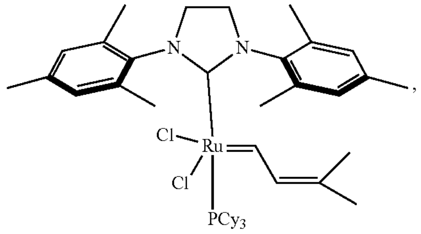

wherein: $R^{19}$, $R^{20}$, $R^{21}$, $R^{22}$, $R^{23}$, $R^{24}$, Cy, $R^{H1}$, $R^{H2}$, $R^{H3}$ and $R^{42}$ are as defined herein.

It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of olefin to catalyst, the catalyst (the "olefin to catalyst ratio"), loading will generally be present in an amount that ranges from a low of about 10,000,000:1, 1,000,000:1, 500,000:1 or 200,00:1, to a high of about 100,000:1 60,000:1, 50,000:1, 45,000;1, 40,000:1, 30,000:1, 20,000:1, 10,000:1, 5,000:1, or 1,000:1.

Articles of Manufacture of the Invention

The invention also relates to articles of manufacture comprising, consisting essentially of, or consisting of at least one composition of the invention.

The invention further relates to methods for making molded articles, comprising, consisting essentially of, or consisting of forming a resin composition comprising, consisting essentially of, or consisting of at least one composition of the invention, contacting the resin composition with at least one substrate, and subjecting the resin composition to conditions effective to promote an olefin metathesis reaction of the at least one norbornene ester, the TCPD, and, if present, the DCPD.

The molded articles of the invention may have an Izod value that decreases by 30% or less after heating at 120° C. for 8 days.

Coating Compositions of the Invention

The invention also relates to coating compositions comprising, consisting essentially of, or consisting of the compositions of the invention.

The compositions of this invention may be optionally formulated with other reactive chemistries to form co-cured coatings. The co-curing process may form interpenetrating polymer networks; for example, a co-cured polyurethane can form from a polyol and a diisocyanate; a co-cured epoxy can form from a bisepoxide and a hardener such as an anhydride, amine, or thiol. Care should be taken when using chemistries that are known to inhibit ROMP. Copolymeric coatings may be formed if multifunctional monomers are incorporated; for example, isocyanate- or alcohol-containing olefinic comonomers can copolymerize urethanes with the compositions of the invention, and epoxide-containing comonomers can copolymerize epoxies with the compositions of the invention. Other polymers such as polysiloxanes, polyureas, and acrylics can be incorporated into the compositions of the invention.

The coating compositions may also contain at least one curing agent. Preferably, the at least one curing agent is selected from an organometallic complex, a free radical initiator, and a cationic initiator.

The invention also relates to a method for coating at least a portion of at least one surface of a substrate or object with a coating composition of the invention, comprising contacting at least a portion of the at least one surface of the substrate with the coating composition of the invention, and subjecting the coated substrate to conditions effective to promote an olefin metathesis reaction of the at least one norbornene ester, TCPD, and optional DCPD in the presence of the at least one curing agent, e.g., an olefin metathesis catalyst. The substrate surface is preferably a clean surface but coating compositions of the invention may also be applied to "dirtier" surfaces than conventional epoxy-based coating compositions. A method of the invention may also apply a UV resistance topcoat over the coatings to provide protection against UV degradation as known in the art. A method of the invention accordingly produces an article of manufacture coated with a cured coating composition of the invention. The invention, therefore, also relates to an article of manufacture, comprising, consisting essentially of, or consisting of the composition of the invention. The article of manufacture may comprise, consist essentially of, or consist of at least one substrate coated with the composition of the invention.

The adhesion to the substrate can be achieved by priming the substrate with an adhesion promoter or by adding an adhesion promoter as a coating additive to the coating formulation.

The invention also relates to a method for coating a steel substrate material, comprising, consisting essentially of, or consisting of:

- blasting the steel surface with blasting media according to SSPC SP10 standards;
- optionally applying an adhesion promoter onto the steel surface;
- applying a coating composition of the invention and at least one additive (preferably, aluminum powder or aluminum flakes);
- curing the coating applied on the steel surface at a temperature between 5° C. to 150° C.

The substrates or objects to be coated may be of any configuration, any weight, any size, any thickness, and/or any geometric shape. Furthermore, the substrates or objects to be coated may be constructed of any material including but not limited to metal such as steel, stainless steel, aluminum, copper, metal alloys, iron, nickel, titanium, and silver as well as stone, plastics, rubbers, polymers, wood, cloth, ceramics, glass, carbon, brick, fabrics, cement, concrete, or composites, such as reinforced plastics and electronic assemblies.

The substrate or object surfaces to be coated may be partially or fully coated.

The coating compositions of the invention can be applied to the substrate material or object to be coated/protected by any method known in the art, including, without limitation, spraying, brushing, dipping, or rolling. The coating composition can be applied on the substrate material or object to be coated with a paint brush. The coating composition can also be sprayed on the substrate material or object to be coated with a film spray gun, a conventional spray gun, a plural component sprayer, a high-volume low pressure (HVLP) or an airless applicator.

Adhesive Compositions of the Invention

The invention also relates to the use of the compositions of the invention as adhesives.

Adhesive compositions of the invention may be prepared by starting with pre-catalyzed compositions of the invention comprising, consisting essentially of, or consisting of the at least one norbornene ester, the TCDP, the optionally DCPD, and the at least one olefin metathesis catalyst. These pre-catalyst compositions may then be mixed with the aforementioned additives to form uncured adhesive compositions of the invention. The uncured adhesive compositions may then be applied to at least some or all of the surface of a substrate and then cured.

Experimental

In the following examples, efforts have been made to ensure accuracy with respect to numbers used (e.g., amounts, temperature, etc.) but some experimental error and deviation should be accounted for. Unless indicated otherwise, temperature is in degrees Celsius [° C.] and pressure is at or near atmospheric. Weight percent (wt. %) and percent by weight are used interchangeably herein. Weight percent of the cyclic olefin compositions were determined from the percent area values obtained by gas chromatography.

GC Method used: Column: DB-5, 30 m×250 μm×0.25 μm film thickness or equivalent 5% Phenyl methyl Siloxane; Manufacturer: Agilent; GC and column conditions: Injector temperature: 280° C., Detector temperature: 310° C.; Oven temperature: Starting temperature: 50° C., hold time: 0.5 minute; Ramp rate 20° C./min to 210° C.; Ramp rate 5° C./min to 240° C.; Ramp rate 20° C./min to 280° C. hold time 2.5 minutes; Carrier gas: Helium 23.5 mL/min; Split ratio: 20.0:1.0.

All glassware was oven dried and reactions were performed under ambient conditions unless otherwise noted.

Materials

TCPD was prepared as described in European Pat. No. EP0271007B2 and purified to greater than 95% by vacuum distillation.

DCPD (Ultrene® 99) was obtained from Cymetech Corporation. A representative lot of Ultrene® 99 comprised DCPD (99 wt %) and TCPD (1 wt %). A modified DCPD base resin containing 20-25 wt % TCPD (and small amounts of higher cyclopentadiene homologs) was prepared by heat treatment of Ultrene® 99 as described in U.S. Pat. No. 4,899,005.

The ruthenium catalysts used in the experimental procedures were prepared using known methods.

HENB was prepared according to the following procedure: HEA (2-hydroxyethyl acrylate) (640 g, 1.0 mol eq.)

was added to a 3 L round bottom flask containing toluene (1 kg). DCPD (1.5 kg) was added to a separate 3 L round bottom flask, and the 3 L flask containing DCPD was affixed with a Vigreaux column and distillation head connected to the condenser. The 3 L flask containing HEA and toluene was connected to the condenser. The DCPD was heated to >160° C. under an inter atmosphere to "crack" the DCPD and form CPD (cyclopentadiene). The CPD (740 g, 2.0 mol eq.) was added dropwise to the HEA/toluene mixture at 10-40° C. under an inert atmosphere. Conversion of HEA to HENB (2-hydroxyethyl bicyclo[2.2.1]hept-2-ene-5-carboxylate) was monitored by GC (gas chromatography). Toluene and reformed DCPD (364 g) were removed from the reaction mixture by vacuum distillation to give the desired HENB product as a colorless liquid (1,004 g, quantitative yield, approx. 98% purity).

Irganox® 1076 antioxidant (BASF) was used where indicated. Butylated hydroxytoluene (BHT) was used where indicated. Kraton 1901FG, CAB-O-SIL® Ultrabond, CAB-O-SIL TS610, CAB-O-SIL TS720 (Cabot corporation), 2-hydroxyethyl bicyclo[2.2.1]hept-2-ene-5-carboxylate (HENB) and liquid methylene diphenyl diisocyanate (MDI) (sold as Mondur® MLQ) were used where indicated.

NBCbSi was prepared according to Polymer Bulletin, 1996, 37:289-295.

All solvents and reagents were purchased from commercial suppliers and used as received unless otherwise noted.

The following abbreviations are used in the examples:

phr weight in grams of the component per hundred grams of cyclic olefin composition g gram(s)

HENB

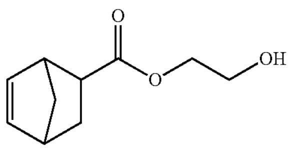 [SMILES: O=C(OCCO)C1CC2C=CC1C2]

2-Hydroxyethyl bicyclo[2.2.1]hept-2-ene-5-carboxylate

NB-Triethoxy Silane

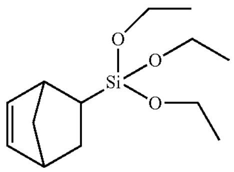 [SMILES: CCO[Si](OCC)(OCC)C1CC2C=CC1C2]

Norbornene Triethoxy Silane [CAS 18401-43-9]

NBCbSi

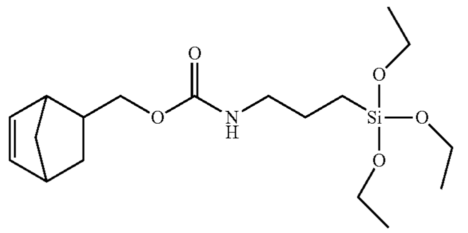 [SMILES: CCO[Si](CCCNC(=O)OCC1CC2C=CC1C2)(OCC)OCC]

Carbamic acid, [3-(triethoxysilyl)propyl]-bicyclo [2.2.1]hept-5-en-2-ylmethyl ester [CAS 187161-66-6]

TCD-ME

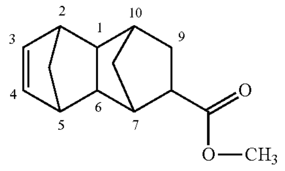

Methyl tetracyclo[4.4.0.12,5.17,10]dodec-8-ene-3-carboxylate; 3-methoxycarbonyltetracyclo [4.4.0.12, 5.17,10] dodec-8-ene

NB-MMA

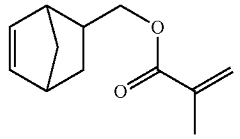

5-Norborene-2-methanol methacrylate

NB-DCPE

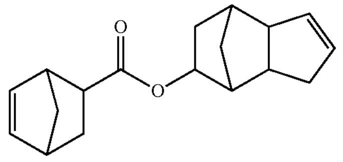 [SMILES: O=C(OC1CC2CC1C1CC=CC21)C1CC2C=CC1C2]

Bicyclo[2.2.1]hept-5-ene-2-carboxylic acid, 3a4,5,6, 7,7a-hexahydro-4,7-methano-1H-inden-6-yl ester [CAS 113201-42-6]

C627

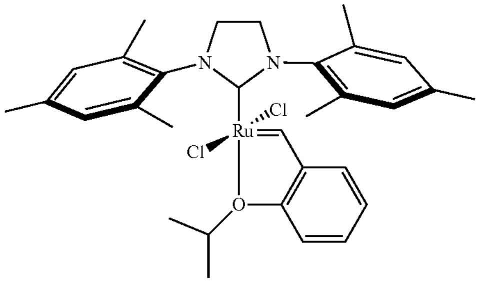

Dichloro[1,3-bis(2,4,6-trimethylphenyl)-2-imidazolidinylidene](2-isopropoxyphenylmethylene) ruthenium(II) [CAS 301224-40-8]

C827

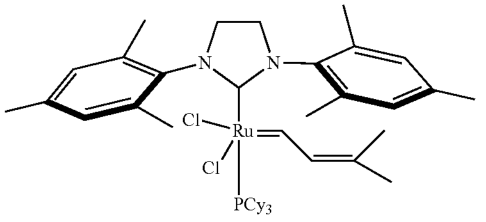

Dichloro[1,3-bis(2,4,6-trimethylphenyl)-2-imidazolidinylidene](3-methyl-2-butenylidene) (tricyclohexylphosphine)ruthenium(II) [CAS 253688-91-4]

C931

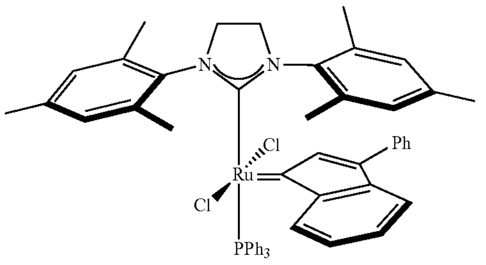

Dichloro[1,3-bis(2,4,6-trimethylphenyl)-2-imidazolidinylidene](3-phenyl-1H-inden-1-ylidene) (triphenylphosphine)ruthenium(II) [CAS 340810-50-6]

Synthesis of Norbornene Esters

The norbornene esters were prepared using the following general procedure.

General Procedure

Cyclopentadiene (CPD) was prepared by reactive distillation of DCPD. See, e.g., Cai et al., Energy & Fuels (2009) 23:4077. The distilled CPD was gradually added to the vessel which contained stirred alkyl acrylate at controlled temperature between 10° C. and 30° C. After adding CPD, the mixture was stirred for a period at room temperature. The reaction mixture was analyzed by GC to determine the reaction progress. If the conversion of acrylate was more than 80% to 90%, the mixture was distilled through a metal packed column under reduced pressure.

Synthesis of $NBCO_2Bu^n$

CPD (651 g, 9.88 mol, 2.0 eq) was slowly added to the thermal-jacketed flask t containing n-butyl acrylate (TCI, 632 g, 4.94 mol, 1 eq) with a magnetic stirrer. Temperature was controlled at 10° C. Two more portions of CPD were slowly added to the mixture (each 325 g). The reaction was continued for 3 days. The norbornene n-butyl ester ($NBCO_2Bu^n$) product was purified by distillation with a metal packed column under ambient temperature. Yield: 68%.

Synthesis of $NBCO_2Me$

CPD (1.6 kg, 24.3 mol) was slowly added to a thermal-jacketed flask containing methyl acrylate (1.9 kg, 22.1 mol). The flask temperature was controlled at 20-30° C. and the content was stirred with an overhead stirrer. The mixture was stirred for over weekend. The norbornene methyl ester ($NBCO_2Me$) product was purified by vacuum distillation under 500 mtorr. Yield: 2.9 kg, 86%; Purity: 99% by GC.

The other norbornene esters used in the examples were prepared in a similar manner.

Miscibility of Norbornene Esters with TCPD

Norbornene methyl ester was dispersed in seven 40-mL scintillation vials with 2, 3, 4, 5, 6, 7, and 8 mL in each vial by an automatic digital dispenser. To each vial the melted TCPD (65° C.) was added with the volume of 8, 7, 6, 5, 4, 3, and 2 mL. The total amount in each vial is 10 mL. The content of the mixture was mixed well, with heating by a heat gun if necessary. The vials were placed on benchtop for 24 h at room temperature. The miscibility was observed visually. Another observation was made after the samples stood at room temperature for 5 days. The samples were heated by a heat gun until melting, which were then placed in a refrigerator at 5° C. for 24 h. Visual miscibility was checked. The vials were continued to stay in the refrigerator for 5 days and the miscibility was check again. The result was tabulated in the following tables.

General Features

For all the five norbornene esters or one norbornene diester, their room temperature miscibility with TCPD are significantly better than the ones at 5° C. Slow solidification or slow partial solidification at either temperature is observed for norbornene esters. The miscibility of norbornene dimethylester (50:50 of endo,endo:exo,exo) with TCPD is much poorer than the ones of norbornene monoesters. It is understandable that the diester/TCPD mixture carries more polar functional groups.

$NBCO_2Me$, $NBCO_2Et$, $NBCO_2Bu^n$, and $NBCO_2EH$

At room temperature or at lower temperature, the miscibility of the alkyl norbornene esters with TCPD are generally in the order of norbornene methyl ester ($NBCO_2Me$) >norbornene ethyl ester ($NBCO_2Et$)>norbornene n-butyl ester ($NBCO_2Bu^n$)>norbornene ethylhexyl ester ($NBCO_2EH$). This is counterintuitive because the expectation would be that the long ester chains would promote the miscibility with TCPD.

$NBCO_2Bu^t$ vs $NBCO_2Bu^n$

Norbornene t-butyl ester ($NBCO_2Bu^t$) and $NBCO_2Bu^n$ have distinct alkyl shapes but their miscibility with TCPD is similar.

TABLE 1

Miscibility of norbornene ester with TCPD at room temperature and at 5° C.

| | RT, 24 h | | | | | | | | RT, 5 days | | | | | | |
|---|---|---|---|---|---|---|---|---|---|---|---|---|---|---|---|
| | 20% | 30% | 40% | 50% | 60% | 70% | 80% | | 20% | 30% | 40% | 50% | 60% | 70% | 80% |
| NBCO2Me | △ | △ | ◯ | ◯ | ◯ | ◯ | ◯ | NBCO2Me | △ | △ | ◯ | ◯ | ◯ | ◯ | ◯ |
| NBCO2Et | △ | △ | ◯ | ◯ | ◯ | ◯ | ◯ | NBCO2Et | △ | △ | ◯△ | ◯ | ◯ | ◯ | ◯ |
| NBCO2Bu$^t$ | △ | ◯△ | ◯△ | ◯ | ◯ | ◯ | ◯ | NBCO2Bu$^t$ | △ | △ | ◯△ | ◯△ | ◯ | ◯ | ◯ |
| NBCO2Bu$^n$ | △ | △ | ◯△ | ◯ | ◯ | ◯ | ◯ | NBCO2Bu$^n$ | △ | △ | ◯△ | ◯ | ◯ | ◯ | ◯ |
| NBCO2EH | △ | △ | ◯ | ◯ | ◯ | ◯ | ◯ | NBCO2EH | △ | △ | △ | ◯△ | ◯ | ◯ | ◯ |
| NB(CO2Me)2 | △ | △ | △ | △ | △ | △ | ◯ | NB(CO2Me)2 | △ | △ | △ | △ | △ | △ | ◯ |
| | 5 C., 24 h | | | | | | | | 5 C., 5 days | | | | | | |
| | 20% | 30% | 40% | 50% | 60% | 70% | 80% | | 20% | 30% | 40% | 50% | 60% | 70% | 80% |
| NBCO2Me | △ | △ | △ | ◯ | ◯ | ◯ | ◯ | NBCO2Me | △ | △ | △ | △ | ◯ | ◯ | ◯ |
| NBCO2Et | △ | △ | △ | ◯△ | ◯ | ◯ | ◯ | NBCO2Et | △ | △ | △ | △ | △ | ◯ | ◯ |
| NBCO2Bu$^t$ | △ | △ | △ | △ | ◯ | ◯ | ◯ | NBCO2Bu$^t$ | △ | △ | △ | △ | ◯△ | ◯ | ◯ |
| NBCO2Bu$^n$ | △ | △ | △ | △ | ◯△ | ◯ | ◯ | NBCO2Bu$^n$ | △ | △ | △ | △ | ◯△ | ◯ | ◯ |
| NBCO2EH | △ | △ | △ | △ | △ | ◯△ | ◯ | NBCO2EH | △ | △ | △ | △ | △ | ◯△ | ◯ |
| NB(CO2Me)2 | △ | △ | △ | △ | △ | △ | △ | NB(CO2Me)2 | △ | △ | △ | △ | △ | △ | △ |

◯△ liquid and solid

◯ liquid

△ solid $NB(CO_2Me)_2$ = norbornene methyl diester

Oxidation Stability of Poly($NBCO_2Me$/TCPD) Vs Poly (DCPD/TCPD) by UV-Vis Spectroscopy Procedure From the panel of poly($NBCO_2Me$/TCPD, 60%/40%) with 0.2 in thickness four pieces of small parts with the dimension of 1.6×0.5×0.2 in (Height×Width×Thickness) were machined out. When two pieces were stacked together it formed cuvette-like object which could be conveniently inserted into a UV-Vis sample holder. Two of parts are kept at room temperature as references and the other two were heated in a convection oven at 120° C. UV-vis and IR spectra were taken at the time of 1 day and 4 days of heating. UV-vis spectra were recorded.

The same procedure was applied to poly(DCPD/TCPD) panel.

Discussion

After 4 days of heating at 120° C., poly($NBCO_2Me$/TCPD) slightly changed color from colorless to light yellow, while poly(DCPD/TCPD) changed color significantly from colorless to stronger yellow brown appearance. It is generally known that absorbance in the blue region of the visible spectrum (400 nm) results in the yellow appearance of aging polymers. UV-vis data confirm the visual observation (FIG. 1). The peak at 400 nm for poly(DCPD/TCPD) gained significant intensity. In FIG. 1, the poly(norbornene methyl ester/TCPD) showed was much less absorbance than that of poly(DCPD/TCPD) after the high temperature aging in air. If the severity of thermal oxidation is proportional to color change, the norbornene ester provided stability to the polymer panel.

Oxidation Stability of Poly($NBCO_2Me$/TCPD) Vs Poly (DCPD/TCPD) by IR Spectroscopy Procedure Polymer powder was filed off from the panel of poly ($NBCO_2Me$/TCPD, 60%/40%). Half of the powder was kept as reference at room temperature. Half of the powder was placed in a beaker and heated in a convection oven at 120° C. for over 24 hours. Reflective IR spectrum was recorded (FIG. 2A).

Figure 2A:
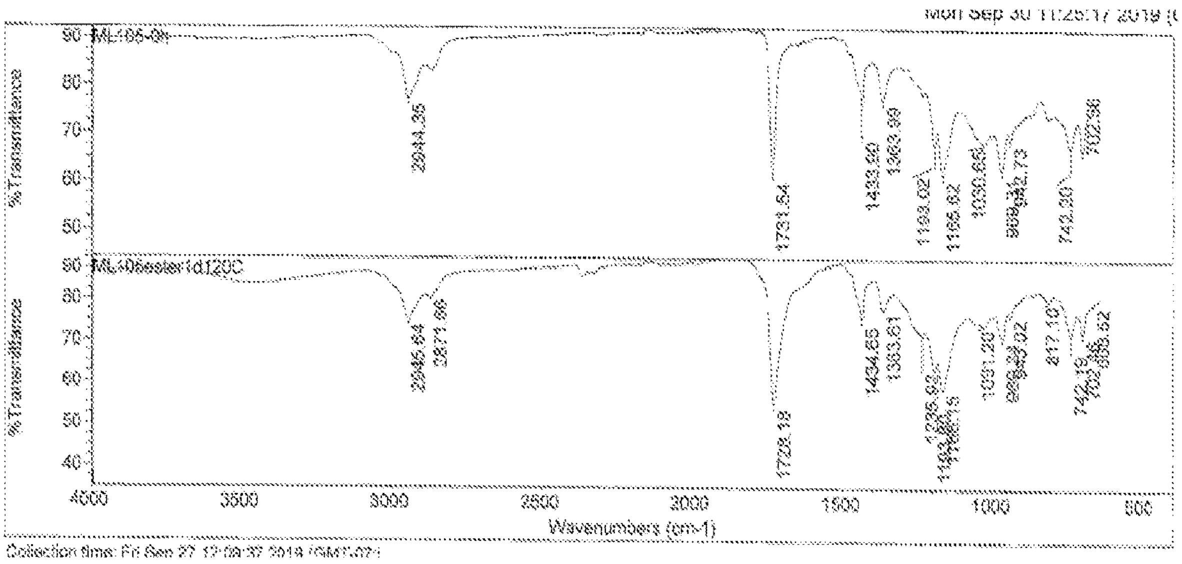
FIG. 2A shows the IR spectrum for poly($NBCO_2Me$/TCPD, 60%/40%) without heating (top trace) and with heating at 120° C. for 24 hours (bottom trace).
Figure 2B:
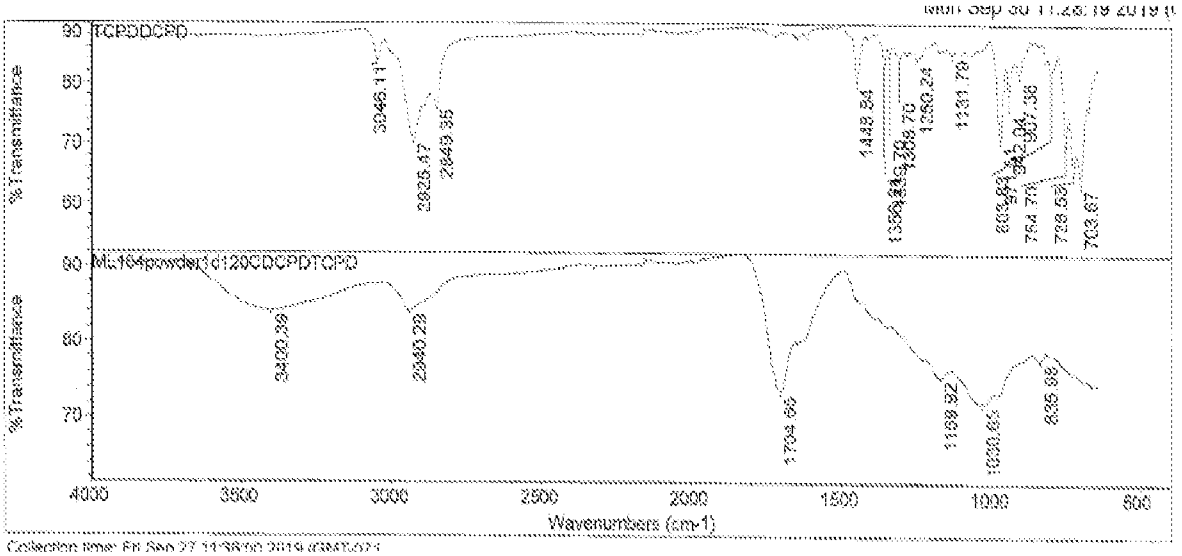
FIG. 2B shows the IR spectrum for poly(DCPD/TCPD, 60%/40%) without heating (top trace) and with heating at 120° C. for 24 hours (bottom trace).

Same procedure was applied to poly(DCPD/TCPD, 60%/40%) panel (FIG. 2B).

Discussion

Comparing FIG. 2A and FIG. 2B, it appears that the powder from norbornene ester/TCPD is more stable that DCPD/TCPD. After exposing to heat at 120° C. for 24 hours, the white solid of poly($NBCO_2Me$/TCPD) was slightly turned to off-white. The bands are corresponding to oxygen oxidation at 3400 $cm^{-1}$ and 1700 $cm^{-1}$, which are COH and C═O, respectively. For the powder of poly ($NBCO_2Me$/TCPD) the oxidation was much less pronounced than that of poly(DCPD/TCPD), as clearly demonstrated by the IR spectrum (FIGS. 2A and 2B).

DSC Trace of the Polymer Powder Under Air

Procedure

Polymer powder was collected by filing the polymer panel of poly($NBCO_2Me$/TCPD, 60%/40% by weight). The powder was use for oxidation study by air at elevated temperature with DSC instrument.

Discussion

Figure 3:
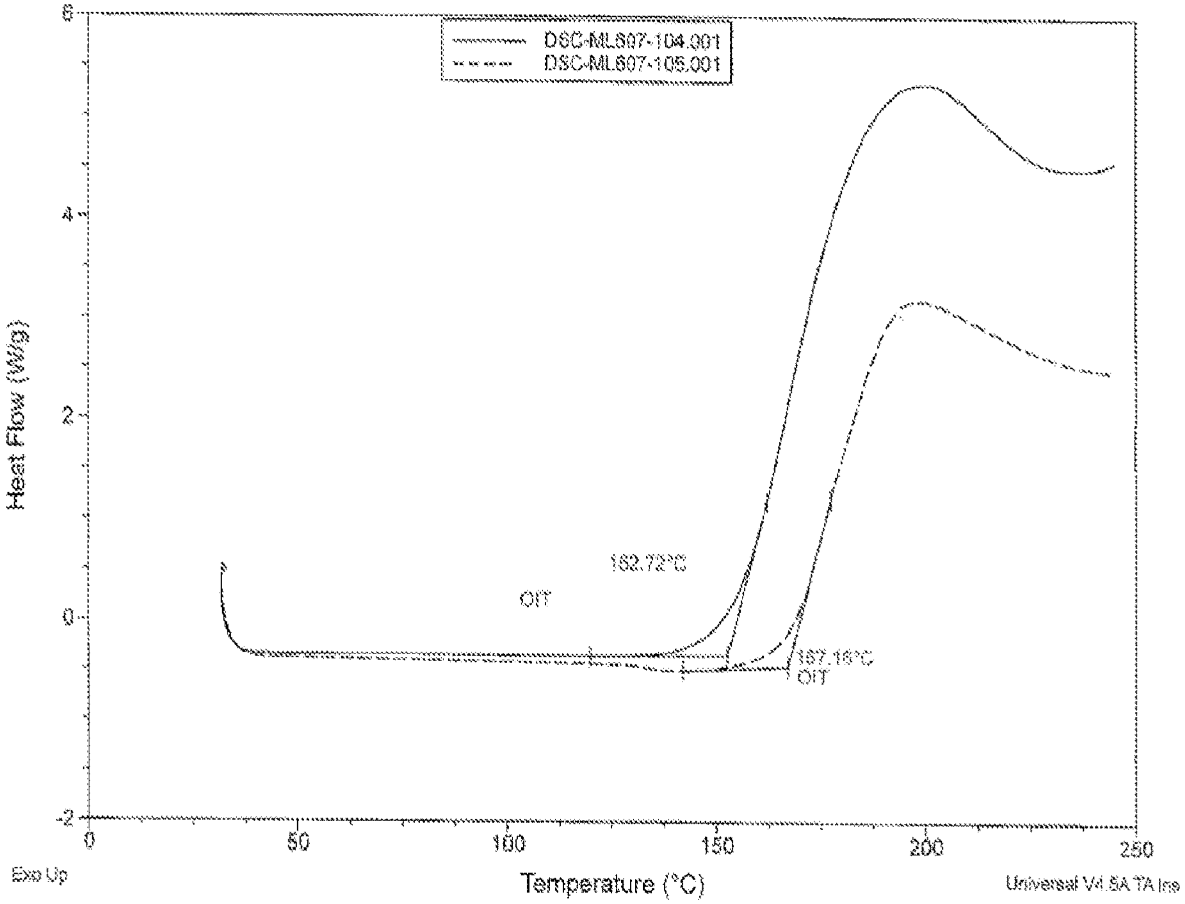
FIG. 3 shows the DSC for poly($NBCO_2Me$/TCPD, 60%/40% by weight) (bottom trace) and the poly(DCPD/TCPD, 60%/40% by weight) (top trace). DSC was carried out under air atmosphere.

The panel made from norbornene methyl ester and TCPD is less prone to oxidation than that of the panel made from DCPD/TDPD. The onset temperature for TCPD/DCPD panel is lower than that of ester containing polymer I (152° C. vs 167° C.) (FIG. 3). The temperature increase is also higher, suggesting more extensive oxidation.

Panel Mechanic Property Change After Heated in Air

Procedure

The analytical samples were pre-cut according to the requirement of the test, which were then placed in a convection oven for 8 days.

Discussion

Most noticeable features shown by heating at 120° C. for 8 days is the Izod value decrease. While poly($NBCO_2Me$/TCPD) panel loses 30% of its original value, poly(DCPD/TCPD) panel suffers 50% loss. It suggests that the polymer panel containing esters groups maintains its integrity better under the aging condition. Other parameters, such as DSC and TGA data, basically do not change much.

TABLE 2

Panel physical property vs aging at 120° C.

| Identifier | Monomer 1 | Monomer 2 | Weight % of Monomer 2 | Notched Izod (ft-lbs/in) | Tg from DSC (° C.) | Time at 120° C., Air |
|---|---|---|---|---|---|---|
| A9 | 40% TCPD | $NBCO_2Me$ | 60% | 1.5 | 112 | 0 |
| A9 (Heat aged) | 40% TCPD | $NBCO_2Me$ | 60% | 1.0 | 114 | 8 days |
| A10 | 40% TCPD | DCPD | 60% | 0.94 | 142 | 0 |
| A10 (Heat Aged) | 40% TCPD | DCPD | 60% | 0.47 | 150 | 8 days |

Notched Izod was measured based on test method ASTM D256
Tensile properties measured based on test method ASTM D638

Mechanical Properties of the Panels

Monoester Series—Procedure

A norbornene ester was mixed with melt TCPD at a ratio of 60%/40% by weight, respectively. The mixture was cooled to room temperature, and BHT and catalyst were added and mixed well. The resin was poured to metal molder (4×6×⅛ in). The molder was transferred to a fireproof convection oven and temperature ramp was started. Initial temperature 40° C., initial cure time 60 minutes, ramp 1° C./minute, post cue time 160° C. The panel was cut into desirable dimensions and summited to different tests. All the other norbornene esters panels were made in the similar way.

TABLE 3

Physical properties of the panels made from norbornene ester and TCPD

| Monomer 1 | Monomer 2 | Notched Izod (ft-lb/in) | Tensile Strength (MPa) | Strain at Break (%) | Tg from DSC (° C.) |
|---|---|---|---|---|---|
| TCPD | $NBCO_2Bu^t$ | 0.90 | 63.4 | 26 | 119 |
| TCPD | $NBCO_2Me$ | 1.1 | 57.1 | 28 | 111 |
| TCPD | $NBCO_2Et$ | 1.6 | 51.6 | 70 | 95 |
| TCPD | $NBCO_2Bu^n$ | 2.2 | 37.4 | 54 | 65 |
| TCPD | $NBCO_2EH$ | 3.6 | 17.6 | 57 | 37 |

Notched Izod was measured based on test method ASTM D256
Tensile properties measured based on test method ASTM D638

Discussion

The Tg of the ester containing polymers are in the order of Methyl>Ethyl>n-Butyl>EthylHexyl. It appears that the longer ester chain the lower Tg. Possibly long ester chain attributes the flexibility of the polymer backbone.

The tert-butyl ester is the outlier of the series, possibly due to the thermal stability of tert-butyl group, generating polymeric acid with the loss of polybutylene. The significant mass loss (25% at 350 C) is the convincing circumstantial evidence.

Coating Formulations Preparation

The coating formulations of the invention were prepared by starting with the preparation of the pre-catalyzed formulations: mixing the base monomer packages with the additives. The base monomer packages comprise at least one norbornene ester. The at least one olefin metathesis catalyst was added to the mixture of monomer and additives to form the coating compositions as described herein.

The monomer compositions were prepared from mixtures of DCPD/TCPD (43/57), TCPD, norbornene esters respectively, by combining specific amounts of these mixtures to obtain the desired ratios of individual monomers. The monomer mixtures of the invention were first mixed into a plastic cup with a magnetic stir bar for 5 min or overhead high-speed mixer for 1 min, depending on the target quantity of the base monomer packages, to prepare the base monomer packages. The compositions of the monomer packages [MP] are described in Table 4.

TABLE 4

Monomer package compositions [MP]

| | MONOMERS [weight %] | | | | | | | |
|---|---|---|---|---|---|---|---|---|
| [MP#] | DCPD | TCPD | $NBCO_2Me$ | $NBCO_2Et$ | $NBCO_2Bu^n$ | NB-MMA | NB-DCPE | TCD-ME |
| MP1 | 43 | 57 | — | — | — | — | — | — |
| MP2 | 16 | 48 | — | 36 | — | — | — | — |
| MP3 | 16 | 48 | — | — | 36 | — | — | — |
| MP4 | 16 | 48 | — | — | — | — | — | 36 |
| MP5 | — | 50 | 50 | — | — | — | — | — |
| MP6 | — | 50 | — | 50 | — | — | — | — |
| MP7 | — | 50 | — | — | 50 | — | — | — |
| MP8 | — | 40 | — | 60 | — | — | — | — |
| MP9 | — | 40 | — | — | — | — | — | 60 |
| MP10 | — | 64 | — | 20 | 16 | — | — | — |
| MP11 | — | 50 | — | — | 40 | 10 | — | — |
| MP12 | — | 45 | — | — | — | — | 55 | — |
| MP13 | 16 | 48 | — | — | — | — | 36 | — |

Additive packages, as described in Table 5 and filler package as described in Table 6, were added to the monomer/co-monomer packages to form the pre-catalyzed formulations, tabulated in Table 7. Irganox was first added to the monomer packages, followed by triphenyl phosphine (TPP). For formulations with CAB-O-SIL®, high-speed overhead mixer with Cowles blade was used to disperse the fumed silica from 350-2000 rpm for 20-30 min, until no agglomerates were visually observed in the dispersions. Formulations with co-monomers were made by adding 10% by weight of the comonomer (the formulations contained only 90% of base monomer packages) using a high-speed mixer for 2-3 min at revolution speed between 600-800 rpm. The dispersant (W980 from BYK) or silane coupling agent (Silquest A-137, A-151, A-174, A-187, A-1630A; A-1871 from Momentive Performance Materials; Norbornene triethoxyl silane, hexadecyl triethoxy silane, isobutyl triethoxy silne, isooctyl triethoxy silane from Gelest), dicumyl peroxide (from Sigma-Aldrich), or Luperox (from BASF) were then added. Then, fillers such as aluminum paste (STAPA 4 n.l. from EcKart Effect Pigments), mica (C-3000™ and C-4000 from Imerys), silica (SIL-CO-SIL 106 from US Silica), micaceous iron oxide (MIOX SG from Kish Co.), Silica flour (aluminum powder (120 Atomized Aluminum Powder, from EcKart Effect Pigments) or ceramic microsphere (W-410 from 3M) were slowly added to the homogenized dispersions using plastic scoops or spatulas, while continuously mixing the formulations with a high-speed mixer at 850-1100 rpm, until addition of the fillers was complete. The formulations with the monomers, co-monomers, rheology modifiers, dispersants, coupling agents, peroxides and fillers were further mixed at 1800-2000 rpm for 15-20 min to ensure no agglomeration of rheology modifiers or fillers. Finally, HENB/MDI or NBCbSi were added to the mixtures followed by degassing with FlackTek high-speed mixer at revolution speed between 500-1600 rpm for 3 min.

TABLE 5

Additives package compositions [AP]

| [AP#] | Irganox 1076 | TPP | HENB:MDI 1:9 | NB-triethoxy silane | NBCbSi | Silquest A-137 | Silquest A-151 | Silquest A-174 | Silquest A-187 |
|---|---|---|---|---|---|---|---|---|---|
| AP1 | 1 | 0.6 | — | — | — | — | — | — | — |
| AP2 | 1 | 0.6 | 2.83 | — | — | — | — | — | — |
| AP3 | 1 | 0.6 | — | 2.83 | — | — | — | — | — |
| AP4 | 1 | 0.6 | — | 5.66 | — | — | — | — | — |
| AP5 | 1 | 0.6 | — | — | 2.83 | — | — | — | — |
| AP6 | 1 | 0.3 | 2.83 | — | — | — | — | — | — |
| AP7 | 1 | 0.3 | — | 2.83 | — | — | — | — | — |
| AP8 | 1 | 0.3 | — | 5.66 | — | — | — | — | — |
| AP9 | 1 | 0.3 | 2.83 | — | — | — | — | — | — |
| AP10 | 1 | 0.3 | 2.83 | — | — | — | — | — | — |
| AP11 | 1 | 0.3 | 2.83 | — | — | — | — | — | — |
| AP12 | 1 | 0.3 | — | — | — | 2.83 | — | — | — |
| AP13 | 1 | 0.3 | — | — | — | — | 2.83 | — | — |
| AP14 | 1 | 0.3 | — | — | — | — | — | 2.83 | — |
| AP15 | 1 | 0.3 | — | — | — | — | — | — | 2.83 |
| AP16 | 1 | 0.3 | — | — | — | — | — | — | — |
| AP17 | 1 | 0.3 | — | — | — | — | — | — | — |
| AP18 | 1 | 0.3 | — | — | — | — | — | — | — |
| AP19 | 1 | 0.3 | — | — | — | — | — | — | — |
| AP20 | 1 | 0.3 | — | — | — | — | — | — | — |
| AP21 | 1 | — | 1.39 | — | — | — | — | — | — |
| AP22 | 1 | — | — | 1.39 | — | — | — | — | — |
| AP23 | 1 | — | — | — | 1.39 | — | — | — | — |
| AP24 | 1 | — | — | — | — | — | 1.39 | — | — |
| AP25 | 1 | 0.6 | — | — | — | — | 1.39 | — | — |
| AP26 | 1 | — | 3.75 | — | 2.5 | — | — | — | — |
| AP27 | 1 | — | 3.75 | — | — | — | — | — | — |

| [AP#] | Silquest A-1630A | Silquest A-1871 | Hexadecyl triethoxy silane | Isobutyl troethoxy silane | Isooctyl triethoxy silane | TS720 | Luperox |
|---|---|---|---|---|---|---|---|
| AP1 | — | — | — | — | — | — | — |
| AP2 | — | — | — | — | — | — | — |
| AP3 | — | — | — | — | — | — | — |
| AP4 | — | — | — | — | — | — | — |
| AP5 | — | — | — | — | — | — | — |
| AP6 | — | — | — | — | — | — | — |
| AP7 | — | — | — | — | — | — | — |
| AP8 | — | — | — | — | — | — | — |
| AP9 | — | — | — | — | — | 2 | — |
| AP10 | — | — | — | — | — | 4 | — |
| AP11 | — | — | — | — | — | — | 0.1 |
| AP12 | — | — | — | — | — | — | — |
| AP13 | — | — | — | — | — | — | — |
| AP14 | — | — | — | — | — | — | — |
| AP15 | — | — | — | — | — | — | — |
| AP16 | 2.83 | — | — | — | — | — | — |
| AP17 | — | 2.83 | — | — | — | — | — |
| AP18 | — | — | 2.83 | — | — | — | — |
| AP19 | — | — | — | 2.83 | — | — | — |

TABLE 5-continued

| Additives package compositions [AP] | | | | | | | |
|---|---|---|---|---|---|---|---|
| AP20 | — | — | — | — | 2.83 | — | — |
| AP21 | — | — | — | — | — | — | — |
| AP22 | — | — | — | — | — | — | — |
| AP23 | — | — | — | — | — | — | — |
| AP24 | — | — | — | — | — | — | — |
| AP25 | — | — | — | — | — | — | — |
| AP26 | — | — | — | — | — | 4 | — |
| AP27 | — | — | — | — | — | 2 | — |

TABLE 6

Fillers package compositions [FP]

| [FP#] | Mica C3000 | Mica C4000 | Micaceous Iron Oxide (MIOX SG) | Micaceous Iron Oxide (MIOX T15) | Silica (SIL-CO-SIL 106) | Ceramic Microsphere W-410 | Aluminum Powder | Al Paste (STAPA 4, n.l.) |
|---|---|---|---|---|---|---|---|---|
| FP1 | 40 | — | — | — | — | — | — | — |
| FP2 | 50 | — | — | — | — | — | — | — |
| FP3 | 60 | — | — | — | — | — | — | — |
| FP4 | 70 | — | — | — | — | — | — | — |
| FP5 | 80 | — | — | — | — | — | — | — |
| FP6 | — | 50 | — | — | — | — | — | — |
| FP7 | — | — | 100 | — | — | — | — | — |
| FP8 | — | — | — | 100 | — | — | — | — |
| FP9 | — | — | — | — | 100 | — | — | — |
| FP10 | — | — | — | — | — | 100 | — | — |
| FP11 | — | — | — | — | — | — | 100 | — |
| FP12 | — | — | — | — | — | — | — | 45 |
| FP13 | 30 | — | 10 | — | — | — | — | — |

The pre-catalyzed formulations were prepared at room temperature. Some xylene solvent was added to highly filled formulations to adjust the viscosity for proper coating application.

TABLE 7

Formulations [F]

| FORMULATIONS | Monomer Package | Additive Package | Filler Package | Solvents |
|---|---|---|---|---|
| F1 | MP2 | AP2 | FP1 | — |
| F2 | MP2 | AP6 | FP1 | — |
| F3 | MP2 | AP6 | FP2 | — |
| F4 | MP2 | AP8 | FP1 | — |
| F5 | MP2 | AP8 | FP2 | — |
| F6 | MP2 | AP3 | FP1 | — |
| F7 | MP2 | AP3 | FP1 | — |
| F8 | MP2 | AP5 | FP1 | — |
| F9 | MP3 | AP6 | FP1 | — |
| F10 | MP3 | AP6 | FP2 | — |
| F11 | MP3 | AP8 | FP1 | — |
| F12 | MP3 | AP8 | FP2 | — |
| F13 | MP4 | AP6 | FP1 | — |
| F14 | MP4 | AP6 | FP2 | — |
| F15 | MP4 | AP8 | FP1 | — |
| F16 | MP4 | AP8 | FP2 | — |
| F17 | MP6 | AP2 | FP1 | — |
| F18 | MP6 | AP6 | FP2 | — |
| F19 | MP6 | AP6 | FP6 | — |
| F20 | MP6 | AP9 | FP12 | — |
| F21 | MP6 | AP10 | FP7 | — |
| F22 | MP6 | AP10 | FP8 | — |
| F23 | MP6 | AP10 | FP9 | — |
| F24 | MP6 | AP10 | FP11 | — |
| F25 | MP6 | AP10 | FP10 | — |
| F26 | MP6 | AP6 | FP3 | 25 Xylene |
| F27 | MP6 | AP6 | FP4 | 40 Xylene |

TABLE 7-continued

Formulations [F]

| FORMULATIONS | Monomer Package | Additive Package | Filler Package | Solvents |
|---|---|---|---|---|
| F28 | MP6 | AP6 | FP5 | 52 Xylene |
| F29 | MP6 | AP3 | FP1 | — |
| F30 | MP6 | AP5 | FP1 | — |
| F31 | MP8 | AP6 | FP2 | — |
| F32 | MP8 | AP10 | FP6 | — |
| F33 | MP8 | AP10 | FP7 | — |
| F34 | MP7 | AP6 | FP1 | — |
| F35 | MP7 | AP6 | FP2 | — |
| F36 | MP7 | AP6 | FP3 | 25 Xylene |
| F37 | MP7 | AP6 | FP4 | 40 Xylene |
| F38 | MP7 | AP6 | FP5 | 52 Xylene |
| F39 | MP7 | AP7 | FP2 | — |
| F40 | MP7 | AP7 | FP1 | — |
| F41 | MP10 | AP6 | FP2 | — |
| F42 | MP5 | AP6 | FP1 | — |
| F43 | MP5 | AP2 | FP2 | — |
| F44 | MP9 | AP6 | FP2 | — |
| F45 | MP9 | AP6 | FP1 | — |
| F46 | MP11 | AP6 | FP2 | — |
| F47 | MP11 | AP11 | FP2 | — |
| F48 | MP6 | AP12 | FP1 | — |
| F49 | MP6 | AP13 | FP1 | — |
| F50 | MP6 | AP14 | FP1 | — |
| F51 | MP6 | AP15 | FP1 | — |
| F52 | MP6 | AP16 | FP1 | — |
| F53 | MP6 | AP17 | FP1 | — |
| F54 | MP6 | AP18 | FP1 | — |
| F55 | MP6 | AP19 | FP1 | — |
| F56 | MP6 | AP20 | FP1 | — |
| F57 | MP7 | AP12 | FP1 | — |
| F58 | MP7 | AP13 | FP1 | — |
| F59 | MP7 | AP14 | FP1 | — |
| F60 | MP7 | AP15 | FP1 | — |

TABLE 7-continued

| Formulations [F] | | | | |
|---|---|---|---|---|
| FORMULATIONS | Monomer Package | Additive Package | Filler Package | Solvents |
| F61 | MP7 | AP16 | FP1 | — |
| F62 | MP7 | AP17 | FP1 | — |
| F63 | MP7 | AP18 | FP1 | — |
| F64 | MP7 | AP19 | FP1 | — |
| F65 | MP7 | AP20 | FP1 | — |
| F66 | MP12 | AP2 | FP1 | — |
| F67 | MP12 | AP3 | FP1 | — |
| F68 | MP12 | AP13 | FP1 | — |
| F87 | MP13 | AP21 | FP1 | — |
| F88 | MP13 | AP22 | FP1 | — |
| F89 | MP13 | AP23 | FP1 | — |
| F90 | MP13 | AP24 | FP1 | — |
| F91 | MP12 | AP21 | FP1 | — |
| F92 | MP12 | AP22 | FP1 | — |
| F93 | MP12 | AP23 | FP1 | — |
| F94 | MP12 | AP24 | FP1 | — |
| F95 | MP1 | AP2 | FP1 | — |
| F96 | MP1 | AP5 | FP1 | — |
| F97 | MP1 | AP25 | FP1 | — |
| F98 | MP2 | AP2 | FP1 | — |
| F99 | MP2 | AP5 | FP1 | — |
| F100 | MP2 | AP25 | FP1 | — |
| F101 | MP6 | AP2 | FP1 | — |
| F102 | MP6 | AP5 | FP1 | — |
| F103 | MP6 | AP25 | FP1 | — |
| F104 | MP1 | AP26 | FP12 | — |
| F105 | MP1 | AP27 | FP13 | — |
| F106 | MP2 | AP27 | FP13 | — |

Catalyst suspensions (2 phr in mineral oil) were added to all the formulations of Table 7. Catalyst C931 was used in all the examples unless otherwise indicated. The catalyzed formulations were mixed and degassed simultaneously using FlackTek high-speed mixer for 30 seconds at 1000 rpm to form uncured coating compositions.

A few commercial samples of coatings were purchased and tested in the same conditions for comparison. These commercial formulations are described in Table 8. The commercial samples were prepared according to their manufacturers' guidelines, when applied on the metal panel substrates and tested in the adhesion pull-off tests.

TABLE 8

| Comparison compositions | |
|---|---|
| FORMULATION | COMMERCIAL COMPOSITION |
| FA | Silicone based with ceramic fillers |
| FB | Phenolic epoxy with amines |
| FC | Phenolic epoxy with amines |
| FD | Phenolic epoxy with amines with glass flakes |

General Procedure for Coating Metal Substrate Panels

Metal Panel Surface Preparation (NACE SSPC SP10 Standard)

Carbon steel panels (6"×6"×¼", 4"×4"×¼", 1"×8"×¼") were grit-blasted using steel grits according to NACE SSPC SP10 standard with a resulting surface profile of 2-3 mils. The uncured coating compositions were then applied onto the panels within 4 hours after sandblasting.

Formulations were applied directly onto the panels using a film applicator, with 18-20 mil wet film thickness. The coatings compositions were allowed to gel at ambient temperature for 30 min to 1 hour, then cured at 150° C. for 1 hour in an oven.

The thickness of the dry film coatings was measured using an ultrasonic thickness gauge from Elcometer. A total of 3 measurements were taken on each coating.

Testing of the Sheet Steel Coated Panels

Pull-Off Adhesion Test According to ASTM D4541

This test method covers a procedure for evaluating the pull-off strength (commonly referred to as adhesion) of a coating system from metal substrates. The major components of a pull-off adhesion tester are a pressure source, a pressure gage and an actuator. During operation, the flat face of a pull stub (dolly) is adhered to the coating to be evaluated.

Prior to the adhesion test, an industrial grade 2K epoxy adhesive was prepared by mixing the 2 components in 10:4.4 ratio in a FlackTek SpeedMixer. Glass beads (0.5-0.6 mm) were incorporated into the adhesive to maintain the bond line thickness of the adhesive between the metal dollies and the cured coatings. Test areas were prepared on the cured coatings by scoring using a 14 mm diameter circular hole saw, such that 14 mm diameter isolated coating circles were formed with exposed steel surface around the circumference of the circles. Aluminum (14 mm) dollies were grit-blasted similar to the carbon steel substrates, while the coating circles were roughened using a sandpaper (100 grit).

The epoxy adhesive was then applied onto the roughened dollies to cover the roughened base of the dolly. The dollies were then carefully placed onto the coating circles, such that the dollies were exactly perpendicular to the substrate. Any excess adhesive was carefully removed to prevent adhesion onto the bare substrate surrounding the dolly. The coatings with the dollies were cured at 75° C. for 4 hours to ensure complete curing of the epoxy adhesive. Three test areas were used per coating. Using an automated PosiTest adhesion tester, the dollies were pulled from the coating. Adhesion strength was reported as average of three adhesion values required to completely detach the dollies from the coating.

Hot Water Immersion Test According to ASTM D870

This test covers the basic principles and operating procedures for testing water resistance of coatings by the partial or complete immersion of coated specimens in distilled or de-mineralized water at ambient or elevated temperatures.

The cured coatings were placed in an enclosed water bath. The water bath was then filled with deionized water to completely submerge the cured coatings. Temperature was increased to 95° C. After 7 days, the panels were removed from the water bath. Visual observations were made to identify changes in the coatings after the test. Also, pull-off adhesion test (ASTM D4541) was conducted on the panels according to procedure explained above. The adhesion performance data for the coated panels before and after hot water immersion are displayed in Table 10. Tables 11 and 12 show further adhesion performance data for the coated panels (Room Temperature (RT) Cured Samples, which were allowed to gel at ambient temperature for 30 min to 1 hour, and Postcured Cured Samples, in which the RT Cured Samples were cured at 150° C. for 1 hour in an oven) before and after hot water immersion (1, 2, and 4 weeks). And Table 13 shows additional adhesion performance data for the coated panels before and after hot water immersion (1, 2, 4, and 8 weeks). Qualitative failure modes were recorded to identify mechanism of failure: A=adhesive failure of coating to steel substrate; C=cohesive failure of coating, G=adhesive or cohesive failure of epoxy glue between coating and dolly. The Pull-Off Strength data is expressed with a ranking system, as described in Table 9. Norbornene ester formulations with a wide variety of monomer composition, additive packages, and filler packages exhibit comparable or better performance in initial adhesion and adhesion after water immersion with favorable failure modes.

TABLE 9

| Ranking System Used in Pull-Off Strength | |
|---|---|
| Ranking Value | Pull-off strength [psi] |
| AA | 2501-3000 |
| BB | 2001-2500 |
| CC | 1501-2000 |
| DD | 1001-1500 |
| EE | 0-1000 |

TABLE 10

Adhesion performance data

| | Initial | | Hot water immersion | |
|---|---|---|---|---|
| FORMULATIONS | Pull-off strength ranking | Failure Mode | Pull-off strength ranking | Failure Mode |
| F1 | AA | G | CC | C |
| F2 | BB | G | CC | Mixed G/C |
| F3 | BB | Mixed G/C | CC | C |
| F4 | BB | G | CC | Mixed G/C |
| F5 | BB | G | BB | Mixed G/C |
| F6 | BB | C | BB | C |
| F7 | BB | C | CC | C |
| F8 | BB | G | CC | C |
| F9 | AA | Mixed G/C | AA | Mixed G/C |
| F10 | BB | G | BB | Mixed G/C |
| F11 | CC | G | CC | Mixed A/G |
| F12 | CC | G | CC | ACS |
| F13 | BB | G | BB | Mixed G/C |
| F14 | BB | G | BB | Mixed G/C |
| F15 | CC | G | AA | Mixed G/C |
| F16 | BB | G | BB | Mixed G/C |
| F17 | AA | G | CC | C |
| F18 | BB | G | BB | C |
| F19 | BB | G | BB | C |
| F20 | BB | Mixed G/C | CC | Mixed G/C |
| F21 | BB | Mixed G/C | AA | Mixed G/C |
| F22 | BB | G | AA | G |
| F23 | AA | G | AA | C |
| F24 | BB | G | AA | ACG |
| F25 | BB | Mixed G/C | BB | Mixed G/A |
| F26 | AA | G | BB | C |
| F27 | AA | G | DD | C |
| F28 | BB | G | DD | C |

TABLE 10-continued

Adhesion performance data

| | Initial | | Hot water immersion | |
|---|---|---|---|---|
| FORMULATIONS | Pull-off strength ranking | Failure Mode | Pull-off strength ranking | Failure Mode |
| F29 | BB | G | CC | C |
| F30 | BB | G | CC | Mixed C/A |
| F31 | BB | G | BB | C |
| F32 | BB | G | BB | Mixed G/C |
| F33 | AA | G | AA | Mixed G/C |
| F34 | AA | G | BB | Mixed G/C |
| F35 | BB | G | CC | C |
| F36 | BB | G | CC | C |
| F37 | BB | G | CC | C |
| F38 | BB | G | DD | C |
| F39 | BB | G | CC | Mixed C/A |
| F40 | BB | G | CC | Mixed G/C |
| F41 | AA | Mixed G/C | BB | C |
| F42 | BB | G | BB | Mixed G/C |
| F43 | BB | G | BB | Mixed G/C |
| F44 | BB | G | CC | C |
| F45 | CC | G | CC | Mixed G/C |
| F46 | BB | ACG | BB | CC |
| F47 | BB | ACG | BB | CC |
| F48 | BB | ACG | EE | ACS |
| F49 | CC | ACG | CC | CC |
| F50 | DD | CC | BB | ACG |
| F51 | CC | CC | CC | CC |
| F52 | CC | CC | CC | CC |
| F53 | CC | CC | DD | CC |
| F54 | EE | ACS | EE | ACS |
| F55 | BB | ACG | CC | ACS, CC |
| F56 | CC | CC | CC | CC |
| F57 | DD | CG | CC | ACS.CC |
| F58 | BB | CC | CC | ACS, CC |
| F59 | DD | CC | CC | CC |
| F60 | DD | CC | CC | CC |
| F61 | DD | CC | DD | CC |
| F62 | CC | CC | CC | ACS, CC |
| F63 | EE | ACS | DD | ACS, CC |
| F64 | CC | ACS | CC | ACS, CC |
| F65 | BB | ACS | CC | ACS, CC |
| F66 | CC | ACG, ACS | CC | CC |
| F67 | CC | ACG, ACS | CC | CC |
| F68 | BB | CC | BB | ACG, CC |
| COMPARISON DATA | | | | |
| FA | EE | C | EE | C |
| FB | CC | C | DD | C |
| FC | BB | C | DD | C |
| FD | EE | C | EE | C |

TABLE 11

Adhesion performance data (RT Cured Samples)

| | Initial | | 1-week hot water immersion | | 2-week hot water immersion | | 4-week hot water immersion | |
|---|---|---|---|---|---|---|---|---|
| FORMU-LATIONS | Pull-off strength ranking | Failure mode | Pull-off strength ranking | Failure mode | Pull-off strength ranking | Failure mode | Pull-off strength ranking | Failure mode |
| F87 | CC | G | CC | C | CC | Mixed G/C/A | DD | Mixed G/C |
| F88 | DD | G | CC | C | CC | C | BB | Mixed G/C (rust) |
| F89 | DD | Mixed A/G | CC | C | CC | Mixed G/C | CC | Mixed G/C |
| F90 | EE | Mixed A/G | CC | C | CC | Mixed G/C | CC | Mixed C/A |

TABLE 11-continued

| Adhesion performance data (RT Cured Samples) | | | | | | | | |
|---|---|---|---|---|---|---|---|---|
| | Initial | | 1-week hot water immersion | | 2-week hot water immersion | | 4-week hot water immersion | |
| FORMU-LATIONS | Pull-off strength ranking | Failure mode | Pull-off strength ranking | Failure mode | Pull-off strength ranking | Failure mode | Pull-off strength ranking | Failure mode |
| F91 | BB | G | EE | C | DD | Mixed A/C | CC | G |
| F92 | EE | G | EE | Mixed C/G | DD | Mixed A/C | DD | Mixed A/C |
| F93 | EE | G | DD | Mixed C/G/A | DD | C | DD | Mixed A/C |
| F94 | EE | A | EE | Mixed C/G | DD | Mixed G/C | DD | A |

TABLE 12

| Adhesion performance data (Postcured Cured Samples) | | | | | | | | |
|---|---|---|---|---|---|---|---|---|
| | Initial | | 1-week hot water immersion | | 2-week hot water immersion | | 4-week hot water immersion | |
| FORMU-LATIONS | Pull-off strength ranking | Failure mode | Pull-off strength ranking | Failure mode | Pull-off strength ranking | Failure mode | Pull-off strength ranking | Failure mode |
| F87 | AA | G | BB | Mixed G/C | CC | C | BB | Mixed G/C |
| F88 | BB | G | BB | Mixed G/C | BB | Mixed G/C | AA | Mixed G/C |
| F89 | BB | G | BB | Mixed G/C | BB | C | BB | Mixed G/C |
| F90 | BB | G | BB | Mixed G/C | CC | G | BB | Mixed G/C |
| F91 | AA | G | CC | C | DD | Mixed G/C | DD | Mixed A/C |
| F92 | BB | G | DD | Mixed G/C | DD | Mixed G/C | CC | Mixed G/C |
| F93 | BB | G | CC | C | CC | Mixed G/C | CC | Mixed A/G/C |
| F94 | CC | Mixed G/C | DD | C | CC | Mixed G/C | CC | Mixed G/C |

TABLE 13

| Adhesion performance data | | | | | | | | | | |
|---|---|---|---|---|---|---|---|---|---|---|
| | Initial | | 1-week hot water immersion | | 2-week hot water immersion | | 4-week hot water immersion | | 8-week hot water immersion | |
| FORMU-LATIONS | Pull-off strength ranking | Failure mode | Pull-off strength ranking | Failure mode | Pull-off strength ranking | Failure mode | Pull-off strength ranking | Failure mode | Pull-off strength ranking | Failure mode |
| F95 | DD | G | CC | Mixed C/G | CC | C | CC | G | CC | Mixed A/C |
| F96 | DD | A | CC | G | CC | Mixed C/G | CC | G | BB | Mixed A/C |
| F97 | EE | A | CC | C | CC | Mixed C/G | CC | G | CC | Mixed A/C/G |
| F98 | DD | G | BB | C | BB | C | BB | Mixed C/G | BB | Mixed C/G |
| F99 | DD | G | CC | C | CC | Mixed C/G | CC | Mixed C/G | BB | Mixed A/C/G |

TABLE 13-continued

Adhesion performance data

| | Initial | | 1-week hot water immersion | | 2-week hot water immersion | | 4-week hot water immersion | | 8-week hot water immersion | |
|---|---|---|---|---|---|---|---|---|---|---|
| FORMULATIONS | Pull-off strength ranking | Failure mode | Pull-off strength ranking | Failure mode | Pull-off strength ranking | Failure mode | Pull-off strength ranking | Failure mode | Pull-off strength ranking | Failure mode |
| F100 | DD | G | CC | Mixed C/G | CC | Mixed C/G | BB | Mixed C/G | BB | Mixed A/C/G |
| F101 | CC | G | CC | Mixed C/G | CC | Mixed A/C/G | CC | Mixed A/C (rust) | CC | Mixed A/some C |
| F102 | CC | G | BB | Mixed C/G | CC | Mixed C/G | BB | Mixed A/C/G | CC | Mixed A/some C |
| F103 | DD | G | CC | Mixed C/G | CC | Mixed C/G | BB | Mixed A/C | CC | Mixed A/C |

Hot/Dry Heat Aging Test

Carbon steel panels (6"×6"×¼", 4"×4"×¼", 1"×8"×¼") were grit-blasted using steel grits according to NACE SSPC SP10 standard with a resulting surface profile of 2-3 mils. The uncured coating compositions were then applied onto the panels within 4 hours after sandblasting. The coatings were then cured at 150° C. for 1 hour unless indicated otherwise. The cured panels were then placed in a forced air oven subjected to heating continuously at 190° C. and 205° C. The panels were taken out of the oven and cooled down to room temperatures periodically for inspection. The time when first crack observed in the coatings was recorded (Table 14).

TABLE 14

Hot/Dry Heat Aging Performance (205° C.)

| FORMULATION | Days of First Crack Observed |
|---|---|
| F1 | >19 |
| F2 | 12 |
| F3 | 22 |
| F4 | 12 |
| F5 | 20 |
| F6 | 27 |
| F7 | >19 |
| F8 | 12 |
| F9 | 22 |
| F10 | 12 |
| F11 | 18 |
| F12 | 12 |
| F13 | 12 |
| F14 | 20 |
| F15 | 12 |
| F16 | 14 |
| F17 | >19 |
| F18 | 25 |
| F19 | 31 |
| F20 | 28 |
| F21 | 9 |
| F22 | 9 |
| F23 | 4 |
| F24 | 9 |
| F25 | 9 |
| F26 | 41 |
| F27 | 43 |
| F28 | 53 |
| F29 | 16 |
| F30 | 16 |
| F31 | 25 |
| F32 | 6 |

TABLE 14-continued

Hot/Dry Heat Aging Performance (205° C.)

| FORMULATION | Days of First Crack Observed |
|---|---|
| F33 | 4 |
| F34 | 8 |
| F35 | 14 |
| F36 | 39 |
| F37 | 43 |
| F38 | 47 |
| F39 | 15 |
| F40 | 14 |
| F41 | 19 |
| F42 | 18 |
| F43 | 21 |
| F44 | 16 |
| F45 | 9 |
| F46 | 41 |
| F47 | 41 |
| F48 | 8 |
| F49 | 8 |
| F50 | 20 |
| F51 | 20 |
| F52 | 18 |
| F53 | 18 |
| F54 | 18 |
| F55 | 11 |
| F56 | 11 |
| F57 | 4 |
| F58 | 8 |
| F59 | 18 |
| F60 | 20 |
| F61 | 11 |
| F62 | 13 |
| F63 | 8 |
| F64 | 8 |
| F65 | 4 |
| F66 | >16 |
| F67 | >16 |
| F68 | 16 |
| F87 (RT Cured) | 20 |
| F88 (RT Cured) | 34 |
| F89 (RT Cured) | 34 |
| F90 (RT Cured) | 27 |
| F91 (RT Cured) | 42 |
| F92 (RT Cured) | 27 |
| F93 (RT Cured) | 20 |
| F94 (RT Cured) | 34 |
| F87 (Postcured Cured) | 33 |
| F88 (Postcured Cured) | 33 |
| F89 (Postcured Cured) | 37 |
| F90 (Postcured Cured) | 28 |
| F91 (Postcured Cured) | 33 |

TABLE 14-continued

| Hot/Dry Heat Aging Performance (205° C.) | |
|---|---|
| FORMULATION | Days of First Crack Observed |
| F92 (Postcured Cured) | 37 |
| F93 (Postcured Cured) | 37 |
| F94 (Postcured Cured) | 28 |
| F95 | 30 |
| F96 | 30 |
| F97 | 44 |
| F98 | 17 |
| F99 | 30 |
| F100 | 17 |
| F101 | 32 |
| F102 | 23 |
| F103 | 20 |
| FA | >55 |
| FB | 33 |
| FC | 8 |
| FD | 19 |

Addition of fillers into the formulations generally improved the hot/dry heat aging performance of coatings. However, addition of mica in formulations exhibited significant improvement of the hot/dry heat aging cracking performance of the coatings across broad monomer compositions compared to micaceous iron oxide, aluminum powder, ceramic microsphere, silica, etc. Increasing the amount of mica filler also further enhance the hot/dry thermal stability of the coatings. Proper choice of type of filler and amount allowed the norbornene ester formulations to attain comparable performance to the commercial coatings. Silane coupling agents were shown to serve as effective alternative isocyanate free adhesion promoters.

Preparation of Adhesive Compositions of the Invention

Adhesive compositions of the invention can be prepared by starting with the preparation of the compositions of the invention: mixing the norbornene esters, TCDP, and at least one olefin metathesis catalyst with additives.

A norbornene ester/TCPD monomer composition was prepared by combining specific amounts of norbornene esters M20-M26 (Table 15) with TCPD to obtain the compositions of the monomer package [MP] described in Table 16. The monomer mixtures of the invention were first mixed into a plastic cup with a magnetic stir bar for 5 min or overhead high-speed mixer for 1 min, depending on the target quantity of the base monomer packages, to prepare the base monomer package.

TABLE 15

Norbornene Esters M20-M26

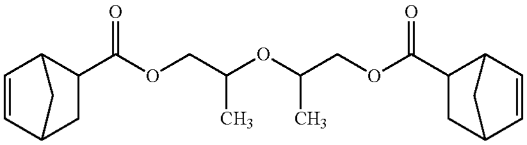 [SMILES: CC(COC(=O)C1CC2C=CC1C2)OC(C)COC(=O)C1CC2C=CC1C2]

M20

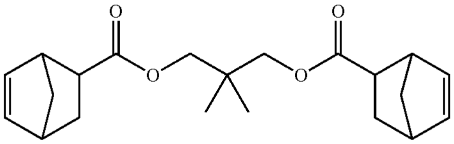 [SMILES: CC(C)(COC(=O)C1CC2C=CC1C2)COC(=O)C1CC2C=CC1C2]

M21

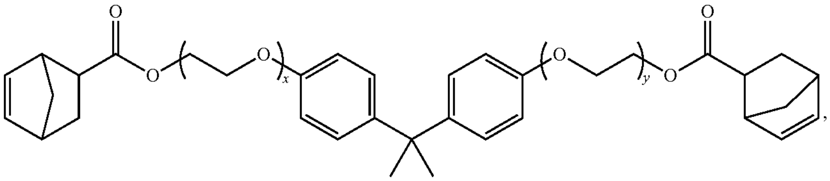

M22 wherein x and y are independently 0, 1, 2, or 3 and the value of x + y is 3

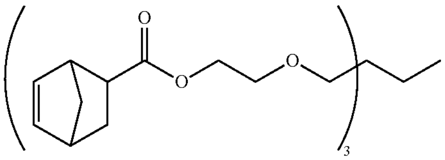

M23

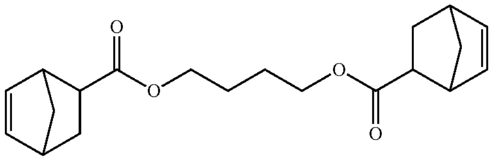 [SMILES: O=C(OCCCCOC(=O)C1CC2C=CC1C2)C1CC2C=CC1C2]

M24

TABLE 15-continued

Norbornene Esters M20-M26

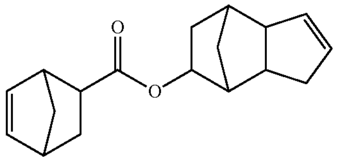 [SMILES: O=C(OC1CC2CC1C1CC=CC21)C1CC2C=CC1C2]

M25

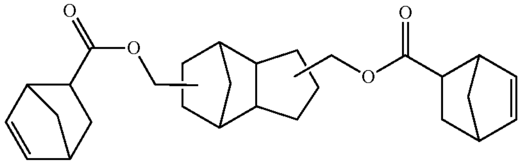

M26

TABLE 16

| Monomer package compositions [MP] | | | | | | | | |
|---|---|---|---|---|---|---|---|---|
| [MP#] | TCPD | M20 | M21 | M22 | M23 | M24 | M25 | M26 |
| MP60 | 50 | 50 | — | — | — | — | — | — |
| MP61 | 50 | — | 50 | — | — | — | — | — |
| MP62 | 50 | — | — | 50 | — | — | — | — |
| MP63 | 50 | — | — | — | 50 | — | — | — |
| MP64 | 50 | — | — | — | — | 50 | — | — |
| MP65 | 50 | — | — | — | — | — | 50 | — |
| MP66 | 50 | — | — | — | — | — | — | 50 |

Synthesis of Di-Norbornene Esters

The di-norbornene esters M20-M24 and M26 were prepared using the following general procedure.

General Procedure

Di-acrylate or norbornene acrylate was added to a flask containing excess cyclopentadiene at ambient temperature or 0° C. Catalyst $Al(OEt)_3$ (1-5 mol %) was added. The mixture was stirred at room temperature for an extended period (hours to days). The completion of the reaction was verified by proton NMR. The suspension was filtered through a silica gel plug. Excess cyclopentadiene was removed by high vacuum at moderate heating. Further purification was carried out by $SiO_2$ gel column.

Synthesis of M24

The diacrylate (44.5 g, 0.25 mol) was mixed with cyclopentadiene (66 g, 1 mol) in a 500 mL round-bottomed flask under nitrogen atmosphere at 0° C. Catalyst $Al(OEt)_3$ (3.3 g, 20 mmol) was added. The mixture was stirred for 16 h. The mixture was filtered through a silica gel plug. Colorless oil was obtained (83 g). The product was further purified by $SiO_2$ column with dichloromethane as eluent. The crude product (ca 10 g) yielded 5.4 g of purified M24 product.

The other di-norbornene esters used in the examples were prepared in a similar manner.

The additive package described in Table 17 was added to the monomer/co-monomer packages to form the formulations shown in Table 18. A high-speed overhead mixer with Cowles blade was used to disperse the CAB-O-SIL® fumed silica from 350-2000 rpm for 20-30 min, until no agglomerates were visually observed in the dispersions. Finally, the other additives were added to the mixtures followed by degassing with FlackTek high-speed mixer at revolution speed between 500-1600 rpm for 3 min.

A catalyst suspension containing 0.7 to 1.2 wt % ROMP catalyst C827 in a white mineral oil carrier was added at 2 phr versus formulation weight to the formulations of Table 18. The catalyzed formulations were mixed and degassed simultaneously using FlackTek high-speed mixer for 30 seconds at 1000 rpm to form uncured adhesive compositions.

TABLE 17

| Additive and Filler package composition [AP] | | | | | |
|---|---|---|---|---|---|
| [AP#] | Ethanox 4702 | Kraton G1651H | Triphenyl phosphine | CAB-O-Sil ® Fumed Silica TS-610 | HENB: MDI 1:9 |
| AP60 | 2 | 4 | 0.05 | 4 | 4 |

TABLE 18

| Formulations [F] | | |
|---|---|---|
| FORMULATIONS [F#] | Monomer Package | Additive Package |
| F80 | MP60 | AP60 |
| F81 | MP61 | AP60 |
| F82 | MP62 | AP60 |
| F83 | MP63 | AP60 |
| F84 | MP64 | AP60 |
| F85 | MP65 | AP60 |
| F86 | MP66 | AP60 |

General Procedure for Preparing Lap Shear Specimens

Surface Preparation

The lap shear specimens were prepared in accordance to ASTM D1102-05 and ASTM D3161. The lap shear panels were prepped by grit-blasting using steel grits before use. The thickness of the adhesive bonds was set at 0.005" by either glass beads, steel wire, or shim tabs.

Once the lap shear specimen surface was prepped, the formulation described in Table 18 were applied to the surfaces described in Table 19.

TABLE 19

| Substrate Material [SU] | |
|---|---|
| Substrate [SU#] | Description |
| SU1 | G10 Epoxy Fiberglass composite |
| SU2 | Proxima ® Fiberglass Composite |

The bonded lap shear samples were submitted to the cure profiles described in Table 20.

TABLE 20

| Cure Profile [CU] | | | | |
|---|---|---|---|---|
| [CU#] | Stage 1 Cure Temp (° C.) | Stage 1 Cure Time (hr) | Stage 2 Cure Temp (° C.) | Stage 2 Cure Time (hr) |
| CU1 | 40 | 1 | 100 | 2 |
| CU2 | 40 | 1 | 120 | 2 |

Testing of the Lap Shear Specimens

Overhead Tensile Lap Shear Test According to ASTM D1102-05 or ASTM D3161

This test method covers a procedure for evaluating the overhead lap shear strength of bonded metal or plastic substrates. A universal testing machine with LabWorks software was used to collect the data. Lap shear strength was reported as an average of three-five specimens tested.

The adhesion performance data for the lap shear specimens is displayed in Table 22 based on Table 21 ranges of lap strength values.

TABLE 21

| Ranking System Used in Lap Shear Strength | |
|---|---|
| Ranking Value | Lab Shear Strength [psi] |
| AA | >4000 |
| BB | 3001-4000 |
| CC | 2001-3000 |
| DD | 1001-2000 |
| EE | <1000 |

TABLE 22

| Lap shear performance data | | | |
|---|---|---|---|
| FORMULATIONS | Substrate | Cure | Lap shear strength ranking |
| F80 | SU1 | CU2 | CC |
| F80 | SU2 | CU2 | BB |
| F81 | SU1 | CU2 | AA |
| F81 | SU2 | CU2 | BB |
| F82 | SU1 | CU2 | AA |
| F82 | SU2 | CU2 | AA |
| F83 | SU1 | CU2 | No Data |
| F83 | SU2 | CU2 | AA |
| F84 | SU1 | CU2 | No Data |
| F84 | SU2 | CU2 | AA |
| F81 | SU2 | CU1 | BB |
| F85 | SU2 | CU1 | BB |
| F86 | SU2 | CU1 | BB |

Chip Test Procedure

Cured coatings were subjected to chip test adapted from ASTM G42. Coatings selected for the test were scored to create 30-45° wedge on the coatings with a knife. A chisel blade was used to leverage the coatings at the interface between the coatings and the substrate. Adhesion of the coatings was determined by assigning values on a scale from 0-10 as shown in Table 23. Optimum coatings were those that did not allow the chisel blade to get under the coating but, rather, create a cohesive failure of the coatings.

TABLE 23

| Rating scale for chip test | |
|---|---|
| 10 | Coating is extremely difficult to remove. Cohesive failure of coating results in small fragments that will crumble off when strong force is applied, but no delamination of the coating from the substrate occurs before cohesive failure of coating. |
| 8 | Coating is difficult to remove. Small fragments will crumble off, and minor delamination (<0.05") occurs with strong force before cohesive failure. |
| 6 | Coating is somewhat difficult to remove. Coating chips from 0.06" to 0.15" removed with slight difficulty. Coating fails cohesively at delamination front; coating at point of failure retains adhesion and does not appear loosened. |
| 4 | Coating is not difficult to remove. Coating chips in excess of 0.25" removed using light pressure. |
| 2 | Coating is easy to remove. Once delamination is started, the coating can be easily peeled to a length of at >0.25". Coating sometimes fails cohesively when removing large sections, but delamination front is loose and disbondment can be continued easily. |
| 0 | Coating is easy to remove and adhesion always fails during scoring. Once delamination is started, the majority or all of the coating can be removed with little effort. |

The catalyst suspensions, shown in Table 24, in a white mineral oil carrier were added at 2 phr versus formulation weight to Formulations F104, F105, and F106, as shown in Table 25, for the chip test. The catalyzed formulations were mixed and degassed simultaneously using FlackTek high-speed mixer for 30 seconds at 1000 rpm to form uncured coating compositions. Table 26 shows the chip test data for the cured coating compositions.

TABLE 24

| Catalyst package [C] | | |
|---|---|---|
| CATALYST | C627 | C931 |
| C1 | 0.3 | 0.5 |
| C2 | 0.65 | 0.15 |
| C3 | 0.8 | — |

TABLE 25

| Coating compositions for chip test [CCT] | | |
|---|---|---|
| COMPOSITIONS | Formulations | Catalyst |
| CCT1 | F104 | C1 |
| CCT2 | F104 | C2 |
| CCT3 | F104 | C3 |
| CCT4 | F105 | C1 |
| CCT5 | F105 | C2 |
| CCT6 | F105 | C3 |
| CCT7 | F106 | C1 |
| CCT8 | F106 | C2 |
| CCT9 | F106 | C3 |

TABLE 26

| Chip Test Ratings | | | | | | | | |
|---|---|---|---|---|---|---|---|---|
| COMPOSITIONS | Rating at −1° C. on panel with ice residue after 2 days | Rating at −1° C. on panel with ice residue after 7 days | Rating at −1° C. after 2 days | Rating at −1° C. after 7 days | Rating at 10° C. after 2 days | Rating at 10° C. after 7 days | Rating at 21° C. after 2 days | Rating at 21° C. after 7 days |
| CCT1 | 0 | 0 | 0 | 0 | 6 | 6 | 6 | 6 |
| CCT2 | 0 | 0 | 6 | 6 | — | — | — | — |
| CCT3 | 0 | 4 | 8 | 8 | — | — | — | — |
| CCT4 | 0 | 2 | 0 | 6 | 6 | 6 | 6 | 8 |
| CCT5 | 0 | 0 | 4 | 4 | — | — | — | — |
| CCT6 | 2 | 2 | 10 | 10 | — | — | — | — |
| CCT7 | 0 | 8 | 8 | 10 | 8 | 10 | 8 | 10 |
| CCT8 | 4 | 4 | 10 | 10 | — | — | — | — |
| CCT9 | 10 | 10 | 10 | 10 | — | — | — | — |

The claimed invention is:

1. A composition comprising:

a) at least one norbornene ester, wherein the at least one norbornene ester is of formula (VII) and has the following structure:

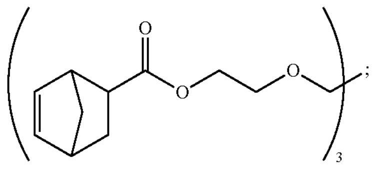

b) tricyclopentadiene (TCPD);

c) optionally dicyclopentadiene (DCPD); and d) at least one olefin metathesis catalyst.

2. The composition of claim 1, wherein:

the at least one norbornene ester is present in the composition in an amount of about 50 wt. % to about 60 wt. %, based on the total weight of the composition; and the TCPD is present in the composition in an amount of about 40 wt. % to about 50 wt. %, based on the total weight of the composition.

3. The composition of claim 1, wherein:

the at least one norbornene ester is present in the composition in an amount ranging from about 30-50 wt. %, based on the total weight of the composition;

the TCPD is present in the composition in an amount ranging from about 50-30 wt. %, based on the total weight of the composition; and the DCPD is present in the composition in an amount ranging from about 20-0.1 wt. %, based on the total weight of the composition.

4. The composition of claim 1, wherein the at least one olefin metathesis catalyst has the structure of Formula (1):

Formula (1)

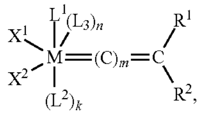

wherein:

M is ruthenium;

$L^1$, $L^2$, and $L^3$ are independently neutral electron donor ligands;

n is 0 or 1;

m is 0, 1, or 2;

k is 0 or 1;

$X^1$ and $X^2$ are independently anionic ligands; and $R^1$ and $R^2$ are independently hydrogen, optionally substituted hydrocarbyl, optionally substituted heteroatom-containing hydrocarbyl; or $R^1$ and $R^2$ are linked together to form one or more cyclic groups, or Formula (2):

Formula (2)

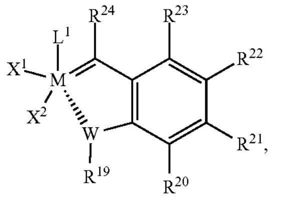

wherein:

M is ruthenium;

$L^1$ is a neutral electron donor ligand;

$X^1$ and $X^2$ are independently anionic ligands;

W is O, halogen, $NR^{33}$ or S;

$R^{19}$ is H, optionally substituted $C_{1-24}$ alkyl, $—C(R^{34})(R^{35})COOR^{36}$, $—C(R^{34})(R^{35})C(O)H$, $—C(R^{34})(R^{35})C(O)R^{37}$, $—C(R^{34})(R^{35})CR^{38}(OR^{39})(OR^{40})$, $—C(R^{34})(R^{35})C(O)NR^{41}R^{42}$, $—C(R^{34})(R^{35})C(O)NR^{41}OR^{40}$, $—C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, $—C(O)R^{25}$, $—OR^{26}$, CN, $—NR^{27}R^{28}$, $NO_2$, $—CF_3$, $—S(O)_xR^{29}$, $—P(O)(OH)_2$, $—OP(O)(OH)_2$, $—SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, $OR^{30}$, $NR^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, $OR^{26}$, —$NR^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl; and x is 1 or 2.

5. The composition of claim 1, further comprising at least one adhesion promoter composition, at least one additive, at least one curing agent, or any combination thereof.

6. The composition of claim 5, where the at least one adhesion promoter composition comprises at least one compound containing at least two isocyanate groups.

7. The composition of claim 5, wherein the at least one adhesion promoter composition further comprises at least one compound containing at least one heteroatom-containing functional group and at least one metathesis-active olefin.

8. The composition of claim 7, wherein the compound containing a heteroatom-containing functional group and a metathesis-active olefin is reacted with the at least one compound containing at least two isocyanate groups.

9. The composition of claim 5, where the at least one adhesion promoter composition comprises at least one organofunctional silane compound.

10. The composition of claim 5, wherein the at least one additive is selected from the group consisting of a gel modifier, a hardness modulator, an impact modifier, an antioxidant, an antiozonant, a filler, a binder, a thixotrope, a rheology modifier, a dispersant, a wetting agent, a plasticizer, a pigment, a flame retardant, a dye, fibers, a reinforcement material, a coupling agent, a UV absorber, a UV light stabilizer, a film former, a lubricant, and mixtures thereof.

11. The composition of claim 10, wherein the at least one additive is an inorganic filler present in an amount ranging from about 0.01-95 wt. %, based on the total weight of the composition.

12. The composition of claim 10, wherein the at least one additive is a coupling agent.

13. An article of manufacture, comprising the composition of claim 1.

14. A method of making a molded article, comprising:

forming a resin composition comprising the composition of claim 1, contacting the resin composition with at least one substrate, and subjecting the resin composition to conditions effective to promote an olefin metathesis reaction of the at least one norbornene ester, the TCPD, and, if present, the DCPD.

15. A method for coating at least one substrate, comprising:

optionally applying an adhesion promoter onto at least a portion of a surface of the at least one substrate;

applying onto the at least portion of the surface of the at least one substrate a composition comprising the composition of claim 1; and curing the coating applied to the substrate surface.

16. An article of manufacture, comprising the at least one coated substrate of claim 15.

* * * * *